US009577931B2

(12) United States Patent
Suzuki et al.

(10) Patent No.: US 9,577,931 B2
(45) Date of Patent: Feb. 21, 2017

(54) SWITCHING SYSTEM, SWITCHING CONTROL SYSTEM, AND STORAGE MEDIUM

(75) Inventors: Yoji Suzuki, Tokyo (JP); Masanori Takashima, Tokyo (JP); Kazushi Kubota, Tokyo (JP); Tetsu Izawa, Tokyo (JP); Masashi Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 104 days.

(21) Appl. No.: 13/821,344

(22) PCT Filed: Jul. 21, 2011

(86) PCT No.: PCT/JP2011/066524
§ 371 (c)(1),
(2), (4) Date: Mar. 7, 2013

(87) PCT Pub. No.: WO2012/032864
PCT Pub. Date: Mar. 15, 2012

(65) Prior Publication Data
US 2013/0170495 A1 Jul. 4, 2013

(30) Foreign Application Priority Data
Sep. 8, 2010 (JP) .................... 2010-200690

(51) Int. Cl.
*H04L 12/28* (2006.01)
*H04L 12/743* (2013.01)
(Continued)

(52) U.S. Cl.
CPC ...... *H04L 45/7457* (2013.01); *H04L 41/0806* (2013.01); *H04L 45/74* (2013.01);
(Continued)

(58) Field of Classification Search
CPC .................... H04L 12/56; H04L 45/7457
(Continued)

(56) References Cited

U.S. PATENT DOCUMENTS 7,281,085 B1 * 10/2007 Garg .................. G11C 15/00
370/235
7,286,535 B2 * 10/2007 Ishikawa et al. ............ 370/392
(Continued)

FOREIGN PATENT DOCUMENTS

CN WO 2009/103225 A1 * 8/2009 ............ H04L 12/56
EP 0 993 153 A1 4/2000
(Continued)

OTHER PUBLICATIONS

International Search Report (ISR) (PCT Form PCT/ISA/210), in PCT/JP2011/066524, dated Sep. 27, 2011.
"OpenFlow Switch Specification Version 0.9.0 (Wire Protocol 0x98) Jul. 20, 2009. Current Maintainer: Brandon Heller (brandon@stanford.edu)". http://www.openflowswitch.org/documents/openflow-spec-v0.9.0.pdf.
(Continued)

*Primary Examiner* — Wei Zhao
*Assistant Examiner* — Abdeltif Ajid
(74) *Attorney, Agent, or Firm* — Finnegan, Henderson, Farabow, Garrett & Dunner, L.L.P.

(57) ABSTRACT

A switch system realizes extension of the number of entries of an open flow table by using tables in a switch as existing resources. Specifically, the switch configures an open flow table by logically combining a plurality of tables, each of which defines processing to a given packet, based on a condition and a processing content defined in each table. The switch refers to the open flow table to determine the processing content to a reception packet. The switch executes the processing of the reception packet based on the determined processing content.

10 Claims, 15 Drawing Sheets

(51) Int. Cl.
*H04L 12/935* (2013.01)
*H04L 12/24* (2006.01)
*H04L 12/851* (2013.01)
*H04L 12/741* (2013.01)

(52) U.S. Cl.
CPC .......... *H04L 47/24* (2013.01); *H04L 49/3009* (2013.01); *H04L 45/745* (2013.01)

(58) Field of Classification Search
USPC .................................................. 370/389, 392
See application file for complete search history.

(56) References Cited

U.S. PATENT DOCUMENTS

| | | | |
|---|---|---|---|
| 8,677,030 B2* | 3/2014 | Srinivasan | 710/22 |
| 2004/0165591 A1 | 8/2004 | Conte et al. | |
| 2004/0202158 A1 | 10/2004 | Takeno et al. | |
| 2005/0157526 A1* | 7/2005 | Hanzawa | G11C 15/043 365/49.12 |
| 2005/0281257 A1* | 12/2005 | Yazaki | H04L 45/00 370/389 |
| 2009/0262750 A1* | 10/2009 | Miyoshi | H04L 12/4625 370/419 |
| 2011/0289230 A1 | 11/2011 | Ueno | |

FOREIGN PATENT DOCUMENTS

| | | |
|---|---|---|
| JP | 2002-185513 A | 6/2002 |
| JP | 2003-304293 A | 10/2003 |
| JP | 2005-252954 A | 9/2005 |
| JP | 2005-277731 | 10/2005 |
| JP | 2006-101343 A | 4/2006 |
| WO | WO 2005/060176 A1 | 6/2005 |
| WO | WO 2010/090182 A1 | 8/2010 |

OTHER PUBLICATIONS

PCT/ISA/237 ( English translation of written opinion of the international searching authority, dated Sep. 27, 2011).
PCT/IB/373
European Search Report dated Feb. 11, 2014.
"Openflow Switch Specification Version 1.0.0 (Wire Protocol OX01)".Internet Citation, Dec. 31, 2009, pp. 1-42, XP008166937.
"Openflow Switch Specification Version 1.1.0 Implemented", Internet Citation, Feb. 28, 2011, pp. 1-56, XP008166938.
Japanese Office Action dated Dec. 13, 2013, with English translation.
Japanese Office Action dated Feb. 2, 2015 with English Translation.
"Multiple Tables", http://archive.openflow.org/documents/OpenFlow_1_1_Multiple_Tables_04_20_2010, Apr. 20, 2010.
"Multiple Tables", http://archive.openflow.org/documents/OpenFlow_1_1_Multiple_Tables_06_22_2010, Jun. 22, 2010.
"Multiple Tables", http://archive.openflow.org/documents/OpenFlow_1_1_Multiple_Tables_05_11_2010, May 11, 2010.
Y. Chiba et al., "Source Flow: Handling Millions of Flows on Flow-based Nodes", Proceedings of the ACM SIGCOMM 2010 conference on SIGCOMM, SIGCOMM, pp. 465-466, Jan. 2010.
Communication Pursuant to Article 94(3) EPC in counterpart EP Application No. 11 823 343.6 dated Apr. 28, 2016.
Y. Kanaumi et al., "The demonstration experience of OpenFlow on JGN2plus", Proceedings of the 2009 IEICE (Institute of Electronics, Information and Communication Engineers) General Conference, Communication 2, pp. 2-3E, Mar. 2009.
T. Koide et al., "A study on the automatic construction mechanism of control network in Open Flow-based network", vol. 109, No. 448, IEICE Technical Report, The Institute of Electronics, Information and Communication Engineers, Feb. 2010.
Notification of Reasons for Refusal mailed on Mar. 15, 2016, by the Japanese Patent Office in counterpart Japanese Patent Application No. 2015-076975.

* cited by examiner

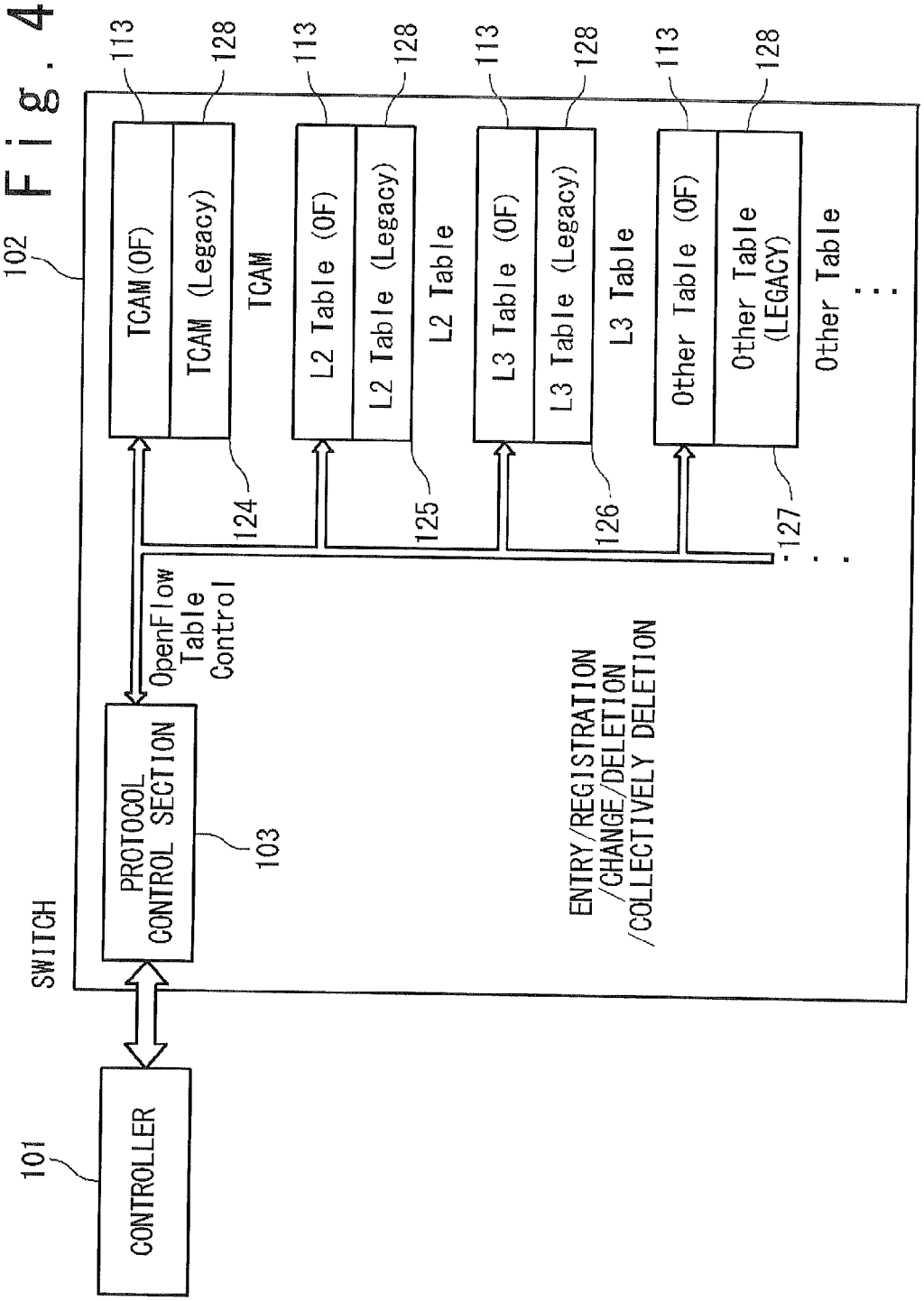

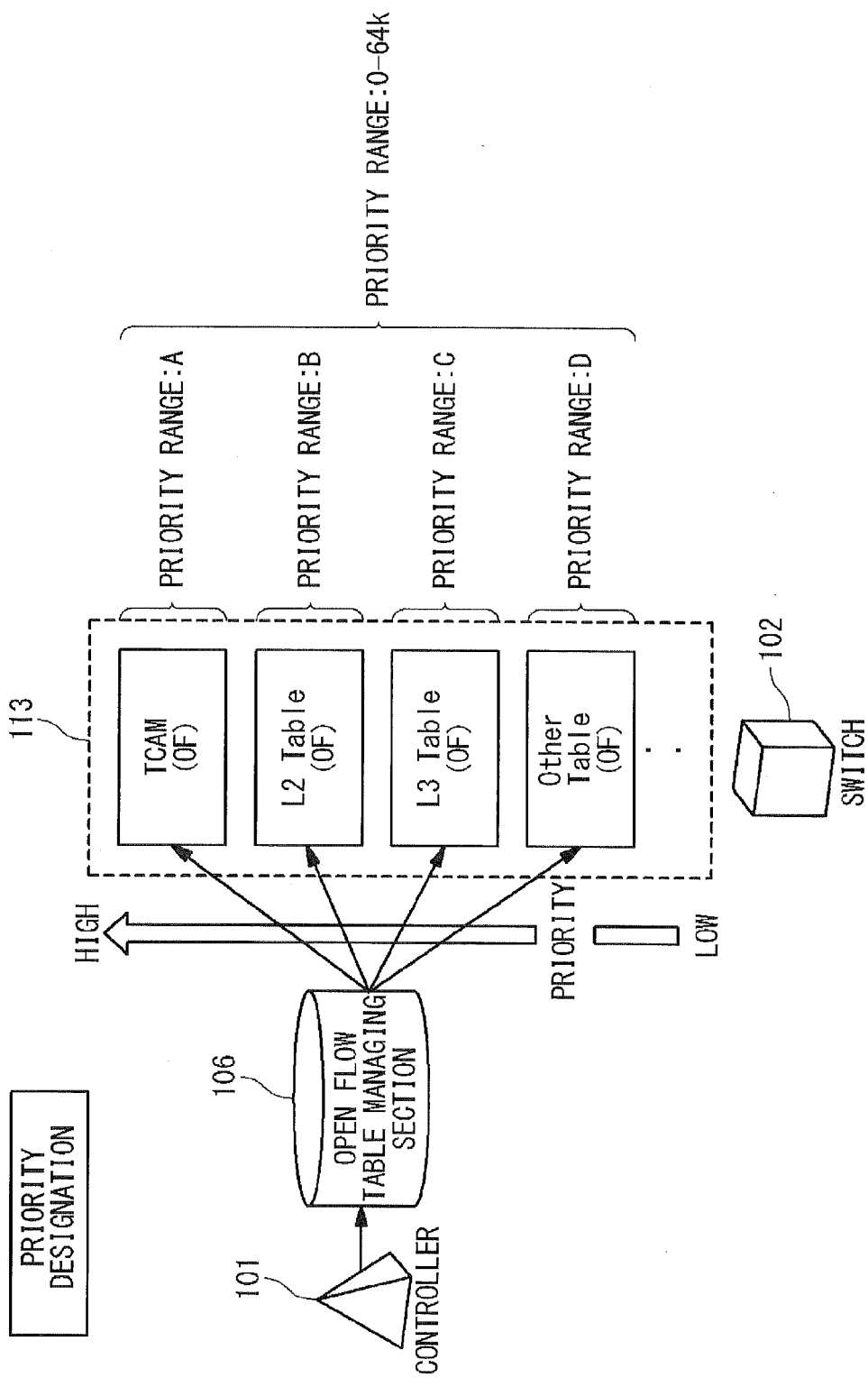

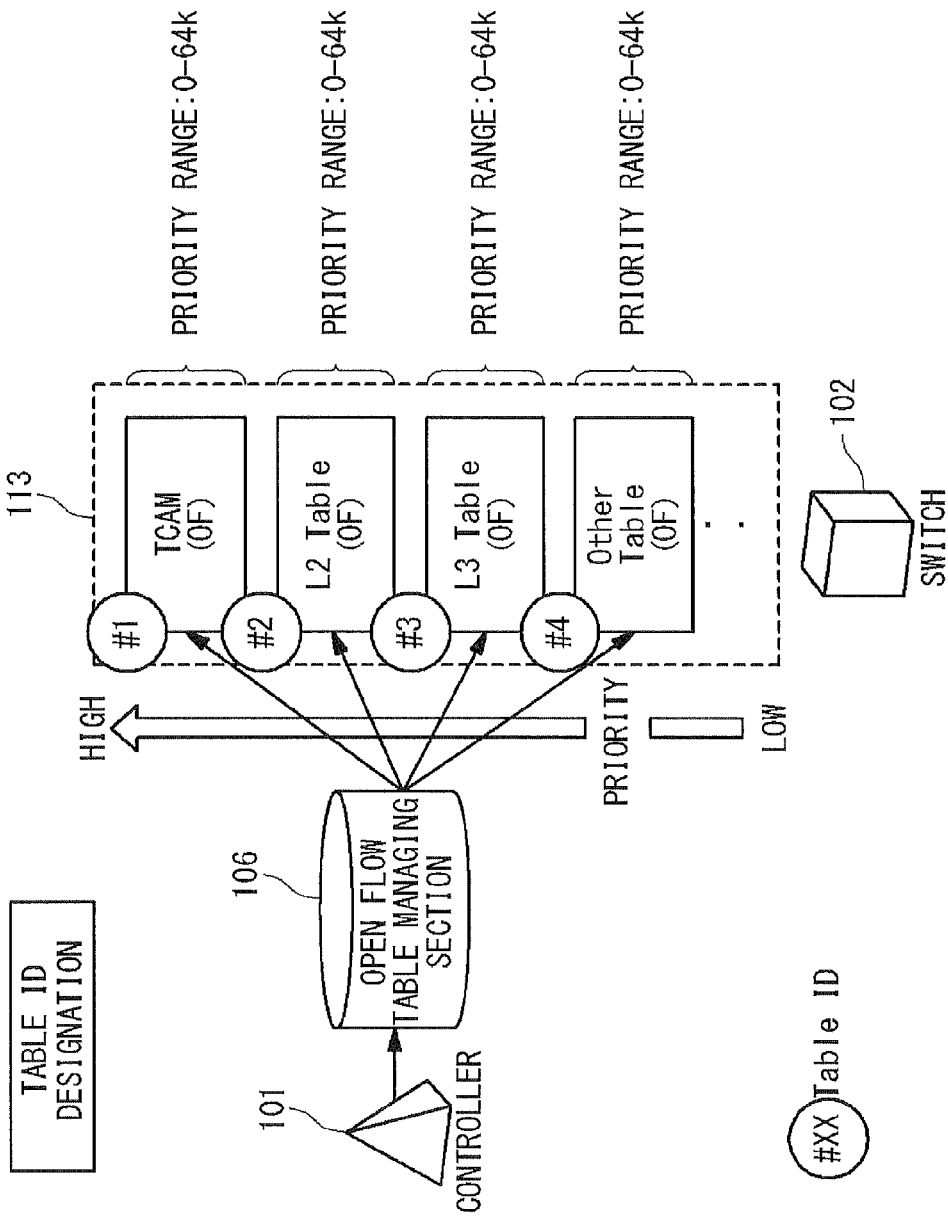

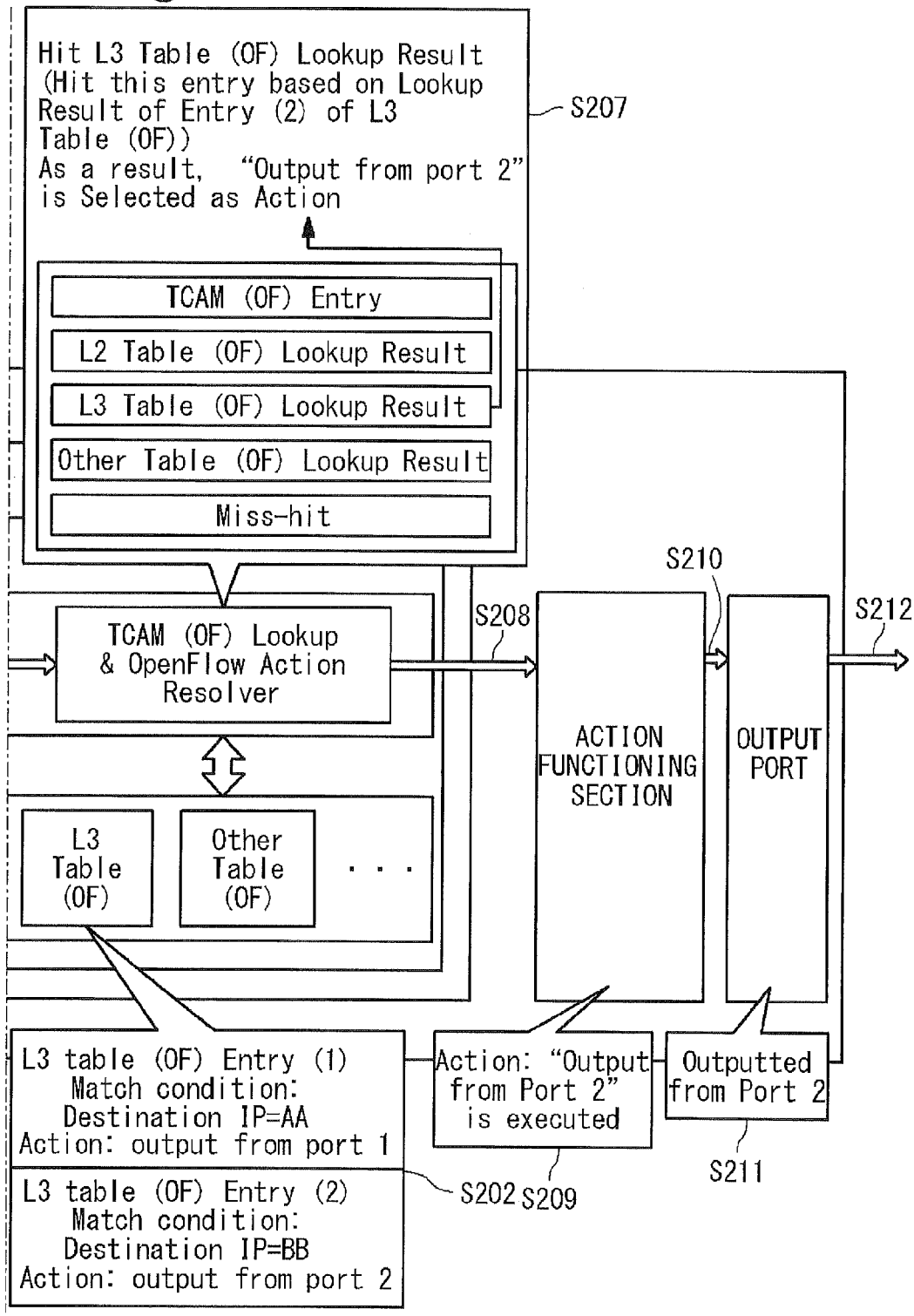

SWITCHING SYSTEM, SWITCHING CONTROL SYSTEM, AND STORAGE MEDIUM

TECHNICAL FIELD

The present invention relates to a switching system, and in particular, to a switching system in which each switch has a plurality of tables.

BACKGROUND ART

In order to control a communication path in a network system, a path control method adopting an OpenFlow technique as a control protocol for communication equipment has been recently developed. A network whose path is controlled according to the OpenFlow technique is referred to as an OpenFlow network.

In the OpenFlow network, a controller such as an OFC (OpenFlow Controller) operates each OpenFlow table of a switch such as OFS (OpenFlow Switch) to control behaviors of the switches. The controller is connected to the switch through a secure channel (Secure Channel) to control the switch by using a control message conforming to an OpenFlow protocol.

The switch in the OpenFlow network is an edge switch or a core switch that constitutes the OpenFlow network and is under control of the controller. A series of types of processing of a packet from reception of the packet at an input-side edge switch in the OpenFlow network to transmission of the packet at an output-side edge switch in the OpenFlow network is referred to as a flow.

The OpenFlow table is a table in which a flow entry is registered that defines a predetermined processing content (action) to be performed to a packet (communication data) conforming to a predetermined match condition (rule).

The rule of the flow entry is defined according to various combinations of some or all of a destination address, a source address, a destination port, and a source port, which are included in a header field of each layer of protocol hierarchy in the packet, and can be distinguished. The above-mentioned addresses include a MAC address (Media Access Control Address) and an IP address (Internet Protocol Address). In addition, information on an ingress port can be also used as the rule of the flow entry.

The action of the flow entry indicates an operation such as "output to a particular port", "discard", and "rewrite a header". For example, when identification information of an output port (for example, output port number) is presented in the action of the flow entry, the switch outputs a packet to the port, and when the identification information of the output port is not presented, the switch discards the packet. Alternatively, when header information is presented in the action of the flow entry, the switch rewrites a header of the packet on the basis of the header information.

The switch in the OpenFlow network executes the action of the flow entry to a packet group (packet sequence) that conforms to a rule of the flow entry.

Details of the OpenFlow switch are described in Non-Patent Literatures 1 and 2.

A large-capacity OpenFlow table is required to control a large amount of flow on the network. In the present circumstances, the TCAM (Ternary Content Addressable Memory) used for the OpenFlow table does not have a large capacity, and therefore, a necessary and sufficient amount of capacity is not ensured. Further, it is difficult to increase the capacity of each table (mainly TCAM) itself of the switch used in the OpenFlow table.

As one of methods of solving the above-mentioned problem, an external TCAM can be used, but this takes costs. Moreover, in equipment for high-speed transfer such as 10G multi-port (network equipment having a plurality of ports, which can correspond to a data transfer rate of 10G bit/second), the external TCAM cannot be employed. Now, there is no external TCAM capable of operating in the 10G switch at least.

CITATION LIST

[Non-Patent Literature 1] "The OpenFlow Switch Consortium"<http://www.openflowswitch.org/>
[Non-Patent Literature 2] "OpenFlow Switch Specification Version 0.9.0 (Wire Protocol 0x98) Jul. 20, 2009 Current Maintainer: Brandon Heller (brandonh@stanford.edu)"<http://www.openflowswitch.org/documents/openflow-spec-v0.9.0.pdf>

SUMMARY OF THE INVENTION

An object of the present invention is to realize extension of the number of entries of an open flow table by using tables in a switch as existing resources.

A switch system of the present invention includes: an open flow functioning section which configures an open flow table by logically combining a plurality of tables, each of which defines processing to a predetermined reception packet, based on a condition and a processing content which are defined in each table, and which refers to the opening flow table to determine the processing content to the reception packet; and an action functioning section which executes processing to the reception packet based on the determined processing content.

A switch control method of the present invention which is executed in an open flow switch, and the switch control method includes: configuring an open flow table by logically combining a plurality of tables, each of which defines processing to a reception packet, based on a condition and a processing content defined in each table; referring to the open flow table to determine the processing content to the reception packet; and executing the processing of the reception packet based on the determined processing content.

A program according to the present invention is a program to make a computer used as a switch execute the processing in the above-mentioned switch control method. It should be noted that the program according to the present invention can be stored in a storage unit and a storage medium.

The present invention allows the controller to make it possible to use the plurality of tables in the switch as one large capacity of open flow table.

BRIEF DESCRIPTION OF THE DRAWINGS

FIG. 4 is a diagram showing the outline of an open flow table control;

FIG. 5 is a diagram showing the details of an example of a first type of open flow table control;

FIG. 6 is a diagram showing the details of an example of a second type of open flow table control;

FIG. 8B is a diagram showing the second operation example of the switch system in case of the packet inflow;

DESCRIPTION OF EXEMPLARY EMBODIMENTS

First Exemplary Embodiment

A first exemplary embodiment of the present invention will be described below with reference to the attached drawings.
(System Structure)

Figure 1:
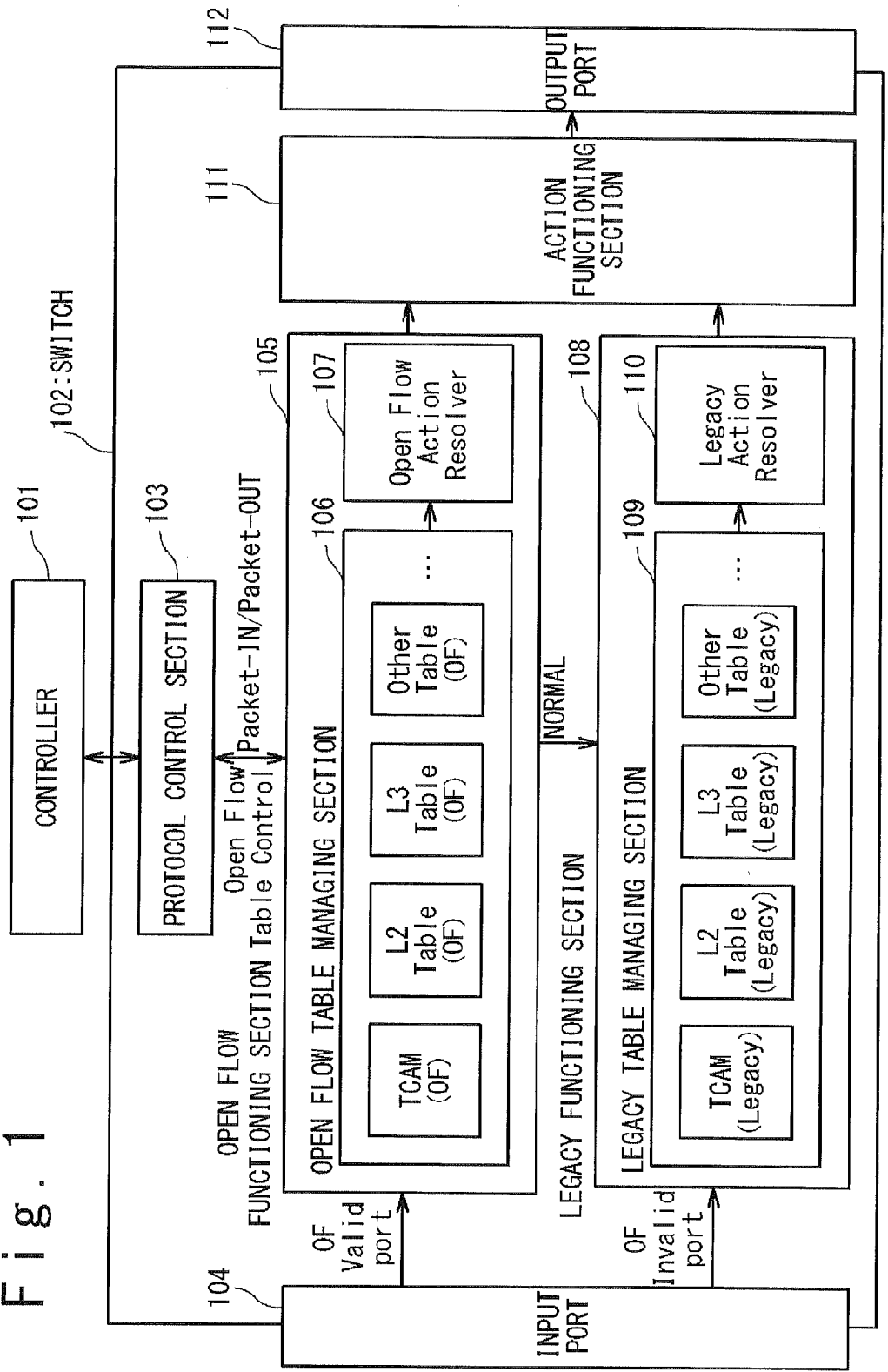
FIG. 1 is a conceptual diagram showing a configuration example of a switch system according to the present invention.

As shown in FIG. 1, a switching system according to the present invention includes a controller 101 and a switch 102.

The controller 101 controls the switch 102 in processing conforming to an OpenFlow protocol.
(Switch Structure)

The switch 102 includes a protocol control section 103, an input port 104, an OpenFlow functioning section 105, a legacy functioning section 108, an action functioning section 111, and an output port 112.

The protocol control section 103 performs protocol control between the controller 101 and the switch 102 when the controller 101 performs communication for controlling the switch 102 in the processing conforming to the OpenFlow protocol. The protocol control section 103 is not necessarily provided in the switch 102, and may be provided in a stage preceding the switch 102.

The input port 104 is a packet input interface. The input port 104 has an OpenFlow valid port and an OpenFlow invalid port. The OpenFlow valid port is an input port conforming to the OpenFlow protocol, and the OpenFlow invalid port is an input port that does not conforms to the OpenFlow protocol.

The OpenFlow functioning section 105 performs processing on a packet inputted from the OpenFlow valid port.

The OpenFlow functioning section 105 includes an OpenFlow table managing section 106 and an OpenFlow action resolver 107.

The OpenFlow table managing section 106 retains the OpenFlow table used by the switch 102. An action (action of OpenFlow processing) for a packet conforming to the Open-Flow protocol is defined in the OpenFlow table.

The OpenFlow action resolver 107 determines the action of the OpenFlow processing on the basis of a lookup result of the OpenFlow table managing section 106.

The legacy functioning section 108 performs processing on the packet inputted from the OpenFlow invalid port.

The legacy functioning section 108 includes a legacy table managing section 109 and a legacy action resolver 110.

The legacy table managing section 109 is a legacy table used by the switch 102. The legacy table managing section 109 defines an action (action of legacy processing) for a packet (normal packet and the like) that does not conform to the OpenFlow protocol.

The legacy action resolver 110 determines the action of the legacy processing on the basis of the lookup result of the legacy table managing section 109. In the legacy processing, a normal switching function is used.

The action functioning section 111 performs the action determined in the OpenFlow functioning section 105 or the legacy functioning section 108.

The output port 112 is a packet output interface.
(Differences Between OpenFlow Processing and Legacy Processing)

In the OpenFlow processing, the packet path is controlled through an external controller. The controller selects an optimum path in the whole network. On the contrary, in the legacy processing, as in a normal switch and router, a path is controlled by autonomous distribution. The normal switch and router determines a network state from information on their environment to select the optimum path.

In the OpenFlow processing, the packet can be identified based on a combination of up to 12 types of information. On the other hand, in the legacy processing, the number of types of information used to identify the packet is small such as a destination MAC address in case of an L2 network and a destination IP address in case of an L3 network. For this reason, it is difficult to perform fine flow control. For example, in the legacy processing, a flow of the same destination IP address but of different source TCP port number is determined as a different flow and a different path is selected.
(Entire Operation of Switching System)

The entire operation of the switching system in FIG. 1 will be described below.
(Packet Input)

When a new packet flows into the switch 102, the switch 102 receives the packet at the input port 104.

The switch 102 checks whether or not the input port 104 receiving the packet is the OpenFlow valid port. For example, the switch 102 checks whether or not the input port 104 is the OpenFlow valid port, by referring to the switch 102 itself or setting information (config) of the input port 104.
(Shift from Packet Inputting to OpenFlow Processing)

When the input port is the OpenFlow valid port, the switch 102 passes the packet from the input port 104 to the OpenFlow functioning section 105.
(OpenFlow Processing)

The OpenFlow functioning section 105 executes lookup processing on the passed packet in the OpenFlow table managing section 106 that retains a plurality of tables of the switch 102.

Next, the OpenFlow functioning section 105 determines an action of the packet on the basis of the lookup result and a priority of each table in the OpenFlow action resolver 107. The priority may be referred to as a priority level.

(Shift from OpenFlow Processing to Execution of Action)

When the determined action is "Packet-IN" (inquiry the action of the packet to the controller) (for example, when no flow entry exists, and the action cannot be determined), the OpenFlow functioning section 105 issues an inquiry (ex. transfer of the packet) to the controller 101 through the protocol control section 103. Initially, the action of all packets other than packets targeted to the legacy processing may be set to "Packet-IN" without any condition. The OpenFlow functioning section 105 receives "Packet-OUT" (a result to the action inquiry from the controller) as a response to the inquiry, determines the content as the action of the packet, and registers it in a table retained by the OpenFlow table managing section 106. Hereinafter, the OpenFlow functioning section 105 determines the action to the packets that follow the same rule as the above-mentioned packet in the OpenFlow action resolver 107.

The OpenFlow functioning section 105 transfers the packet to the action functioning section 111 on the basis of the determined action. That is, a main unit that processes the packet shifts from the OpenFlow functioning section 105 to the action functioning section 111.

(Shift from OpenFlow Processing to Legacy Processing)

When the determined action is "NORMAL" (packet processing using the legacy functioning section 108), the OpenFlow functioning section 105 passes the packet to the legacy functioning section 108. That is, the main unit that processes the packet shifts from the OpenFlow functioning section 105 to the legacy functioning section 108.

(Shift from Packet Input to Legacy Processing)

When the input port 104 is the OpenFlow invalid port or the action to the packet determined in advance (previously) in the OpenFlow functioning section 105 is "NORMAL", the switch 102 passes the packet from the input port 104 to the legacy functioning section 108. That is, the main unit that processes the packet shifts from the input port 104 to the legacy functioning section 108.

(Legacy Processing)

The legacy functioning section 108 executes the lookup processing to the received packet in the legacy table managing section 109 configured of the plurality of tables of the switch 102.

(Shift from Legacy Processing to Execution of Action)

Next, the legacy functioning section 108 determines the action of the packet on the basis of a lookup result and a priority of each table in the legacy action resolver 110. That is, the main unit that processes the packet shifts from the legacy functioning section 108 to the action functioning section 111.

The legacy processing in the legacy functioning section 108 to legacy action resolver 110 uses a normal switch function and therefore, detailed description thereof is omitted.

(Execution of Action)

The action functioning section 111 performs an action determined in the OpenFlow functioning section 105 or the legacy functioning section 108 to the packet.

As examples of the action determined in the OpenFlow functioning section 105, rewrite of header information, output of a packet from a designated output port, and discarding of a packet are exemplified. As examples of the action determined in the legacy functioning section 108, transfer of a packet by routing or the like. However, the present invention is not limited to these examples.

Finally, when the action to be performed includes "packet output", the action functioning section 111 outputs the packet from a proper output port 112 according to the content of the action.

(Control of OpenFlow Table by Controller)

The controller 101 can control the OpenFlow table managing section 106 of the switch 102 through the protocol control section 103. Here, "control of the OpenFlow table managing section 106" means registration/change/deletion/batch deletion and the like of the flow entries in the OpenFlow table.

Each of the tables of the switch 102, which are retained in the OpenFlow table managing section 106 for the OpenFlow table, does not necessarily conform to all operations defined in the OpenFlow specification.

For this reason, the controller 101 needs to control the OpenFlow table managing section 106 in consideration of functions that can be achieved by the respective tables retained by the OpenFlow table managing section 106 for the OpenFlow table (actions that can be set).

(Details of OpenFlow Functioning Section)

Figure 2:
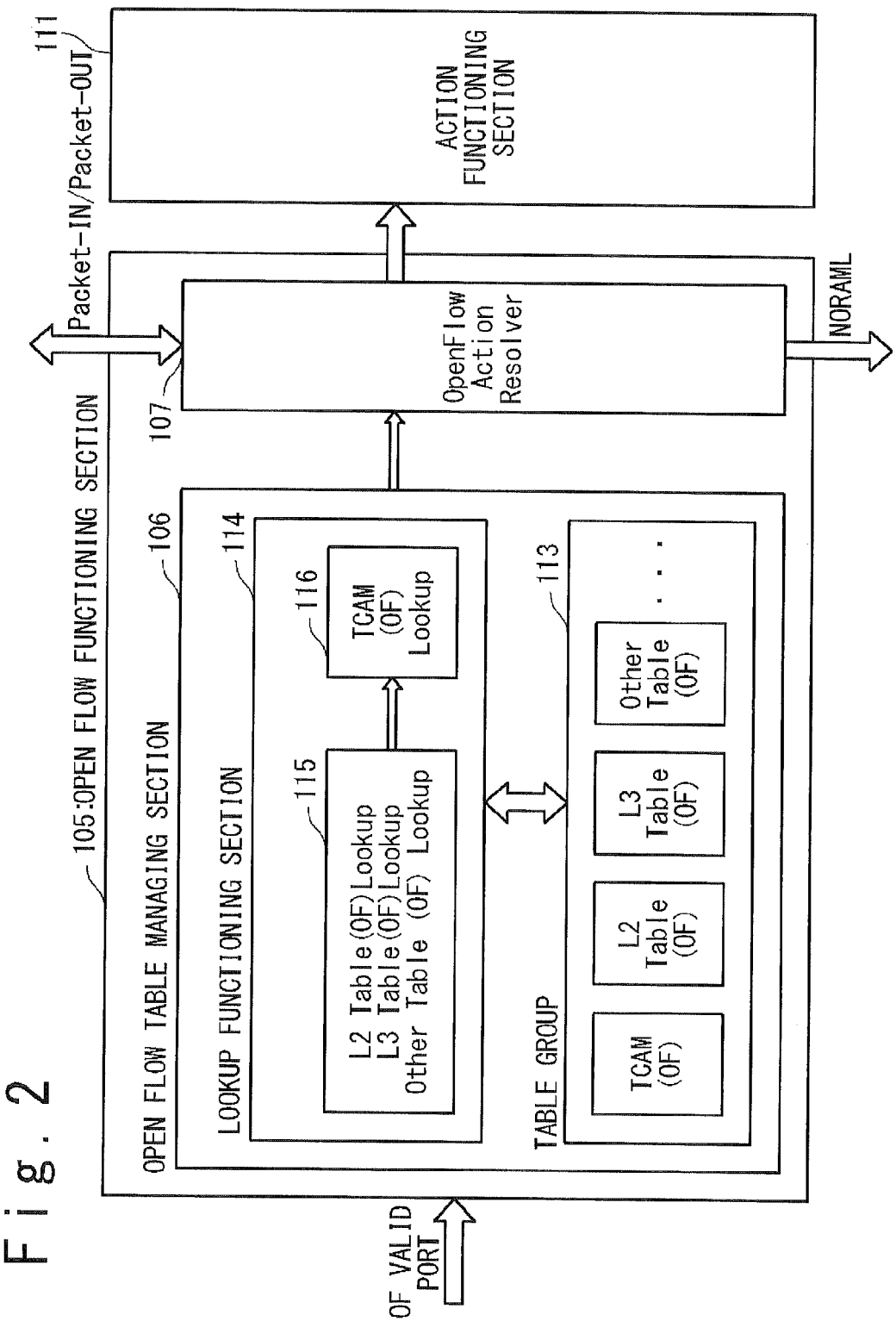
FIG. 2 is a conceptual diagram showing details of an open flow functioning section according to a first exemplary embodiment of the present invention.

FIG. 2 is a diagram showing details of the OpenFlow functioning section 105 of the present invention.

The OpenFlow functioning section 105, the OpenFlow table managing section 106, the OpenFlow action resolver 107, and the action functioning section 111 have the same mechanisms and functions as those in FIG. 1.

The OpenFlow functioning section 105 includes the OpenFlow table managing section 106 and the OpenFlow action resolver 107.

The OpenFlow table managing section 106 includes a table group 113 and a lookup functioning section 114.

The table group 113 is a table group constituting the OpenFlow table.

The lookup functioning section 114 looks up data of an inputted packet on the basis of the table group 113.

The lookup functioning section 114 includes an L2/L3/other table (OF) lookup functioning section 115 and a TCAM (OF) lookup functioning section 116.

"OF" is an abbreviation of "OpenFlow".

The L2/L3/other table (OF) lookup functioning section 115 refers to an L2 table (OF), an L3 table (OF), and other table (OF) for the inputted packet to look up an entry. A multicast routing table is exemplified as an example of the other table (OF). That is, the L2/L3/other table (OF) lookup functioning section 115 looks up the tables for the inputted packet in units of protocols.

The TCAM (OF) lookup functioning section 116 refers to TCAM (OF) for the inputted packet to look up an entry. That is, the TCAM (OF) lookup functioning section 116 looks up TCAM for the inputted packet.

(Operations of OpenFlow Functioning Section)

Operations of the OpenFlow functioning section 105 shown in FIG. 2 will be described below.

The input port 104 passes the packet inputted from the OpenFlow valid port to the OpenFlow functioning section 105.

The OpenFlow functioning section 105 executes the lookup processing to the passed packet in the OpenFlow table managing section 106 configured of the plurality of tables of the switch 102.

At this time, the lookup functioning section 114 of the OpenFlow table managing section 106 performs the lookup processing on the basis of entry information registered in the table group 113 constituting the OpenFlow table.

Specifically, in the lookup functioning section 114, the L2/L3/other table (OF) lookup functioning section 115 first performs the lookup processing and then, the TCAM (OF) lookup functioning section 116 performs the lookup processing.

The lookup functioning section 114 passes the lookup result to the OpenFlow action resolver 107.

The OpenFlow action resolver 107 determines the action of the packet on the basis of the lookup result and the priority of each table.

(Example of Hardware)

Specific examples of hardware for realizing the switching system according to the present invention will be described below.

As an example of the controller 101, a computer such as a PC (personal computer), a work station, a main frame, and a supercomputer are exemplified. The controller 101 may be an extension board mounted on the computer or a virtual machine (Virtual Machine (VM)) constructed on a physical machine.

As an example of the switch 102, an L3 switch (layer 3 switch), an L4 switch (layer 4 switch), an L7 switch/application switch (layer 7 switch), or a network switch (network switch) such as a multi-layer switch are exemplified. In addition, as an example of the switch 102, a router (router), proxy (proxy), a gateway, a firewall, a load balancer (load distribution device), a band controller/security monitor controller (gatekeeper), a base station, an access point (AP), a communication satellite (CS), and a computer having a plurality of communication ports are exemplified.

The protocol control section 103, the OpenFlow functioning section 105, the OpenFlow table managing section 106, the OpenFlow action resolver 107, the legacy functioning section 108, the legacy table managing section 109, the legacy action resolver 110, and the action functioning section 111 are realized by a processor that runs based on a program and executes predetermined processing, and a memory that stores the program and various types of data.

As an example of the above-mentioned processor, a CPU (Central Processing Unit), a network processor (NP), a microprocessor, a microcontroller, or a semiconductor integrated circuit (Integrated Circuit (IC)) having a dedicated function are exemplified.

As an example of the above-mentioned memory, a RAM (Random Access Memory), a semiconductor storage device such as a ROM (Read Only Memory), an EEPROM (Electrically Erasable and Programmable Read Only Memory) and a flash memory, an auxiliary storage device such as an HDD (Hard Disk Drive) and an SSD (Solid State Drive), a removable disc such as a DVD (Digital Versatile Disk), and storage media (media) such as an SD memory card (Secure Digital memory card) are exemplified. A buffer and a register may be adopted. Alternatively, a storage device using DAS (Direct Attached Storage), FC-SAN (Fibre Channel-Storage Area Network), NAS (Network Attached Storage), IP-SAN (IP-Storage Area Network) and the like may be adopted.

The processor and the memory may be integrated. For example, in recent years, the microcomputer and the like have been integrated into one chip. Accordingly, a 1-chip microcomputer mounted in electronic equipment can be provided with the processor and the memory.

Alternatively, each of the protocol control section 103, the OpenFlow functioning section 105, the OpenFlow table managing section 106, the OpenFlow action resolver 107, the legacy functioning section 108, the legacy table managing section 109, the legacy action resolver 110, and the action functioning section 111 may be an extension board mounted on a computer or a virtual machine (VM) constructed on a physical machine.

As an example of the input port 104 and the output port 112, a semiconductor integrated circuit such as a board conforming to network communication (mother board or I/O board), a network adaptor such as NIC (Network Interface Card) or similar extension cards, a communication device such as an antenna, and a communication port such as a connection port (connector) are exemplified.

Also, an example of the network used by the input port 104 and the output port 112, the Internet, a LAN (Local Area Network), a wireless LAN (Wireless LAN), a WAN (Wide Area Network), a backbone (Backbone), a cable television (CATV) line, a fixed-phone network, a mobile-phone network, WiMAX (IEEE 802.16a), 3G (3rd Generation), a lease line (lease line), IrDA (Infrared Data Association), Bluetooth (registered trademark), a serial communication line, and a data bus are exemplified.

It should be noted that each of the protocol control section 103, the OpenFlow functioning section 105, the OpenFlow table managing section 106, the OpenFlow action resolver 107, the legacy functioning section 108, the legacy table managing section 109, the legacy action resolver 110, and the action functioning section 111 may be a module (module), a component (component), or a dedicated device, or their start (calling) program.

However, the present invention is not limited to these examples.

[(Details of OpenFlow Action Resolver)

Figure 3:
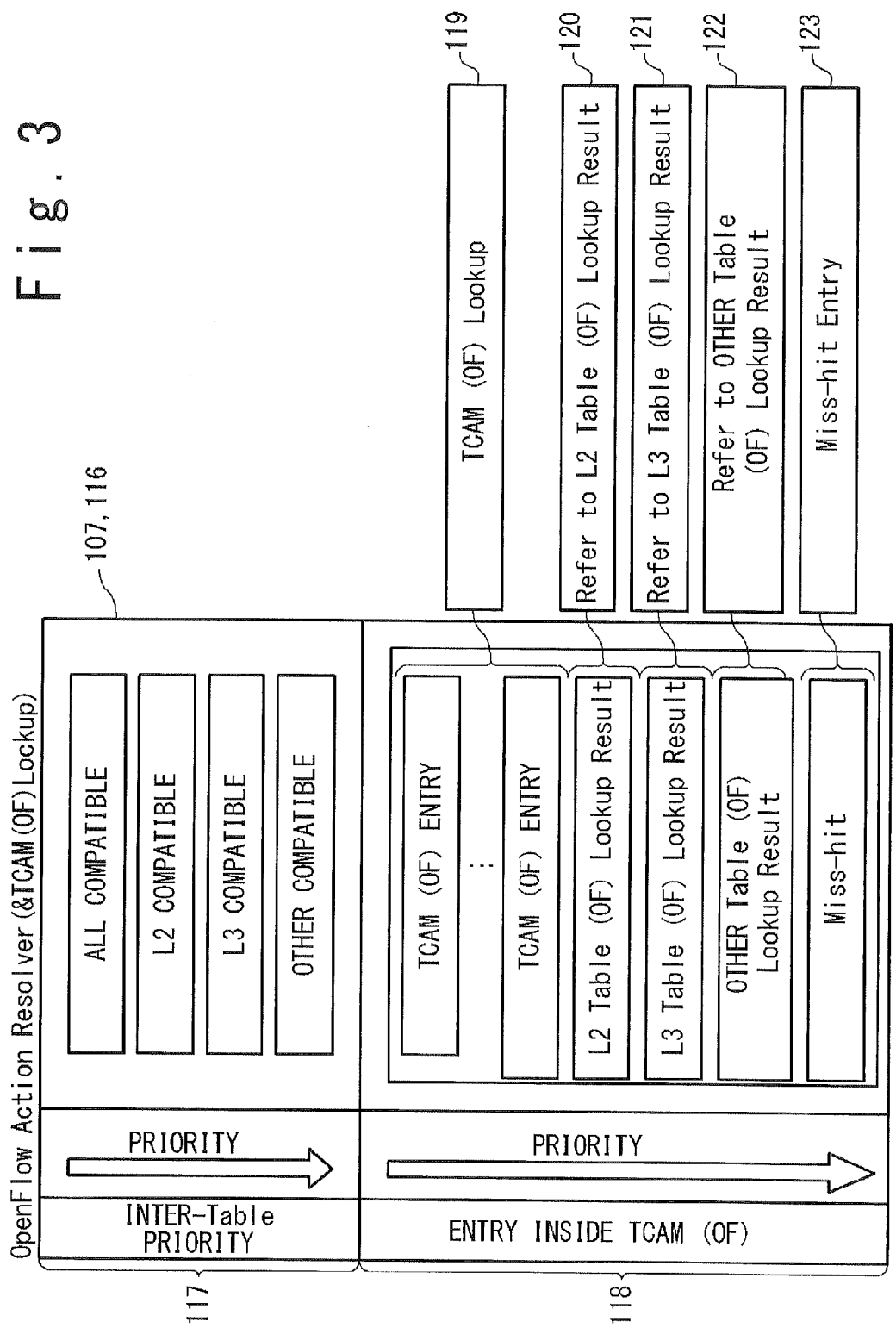
FIG. 3 is a conceptual diagram showing details of an open flow action resolver according to the first exemplary embodiment of the present invention.

FIG. 3 is a diagram showing details of the OpenFlow action resolver 107 of the present invention.

The OpenFlow action resolver 107 and the TCAM (OF) lookup functioning section 116 have the same mechanism and function as those in FIG. 2.

The OpenFlow action resolver 107 is realized as a part of the TCAM (OF) lookup functioning section 116 by adjusting entry mapping of TCAM (OF).

For this reason, the OpenFlow action resolver 107 and the TCAM (OF) lookup functioning section 116 substantially constitute one function block (TCAM (OF) Lookup & OpenFlow Action Resolver). The function block has an inter-table priority 117 and an entry 118 in the TCAM (OF).

The inter-table priority 117 indicates an expected action priority. The entry 118 in TCAM (OF) indicates entry mapping in TCAM (OF) corresponding to the priority.

The entry 118 in TCAM (OF) includes a TCAM (OF) lookup entry group 119, an L2 table (OF) lookup result referring entry 120, an L3 table (OF) lookup result referring entry 121, other table (OF) lookup result referring entry 122, and a Miss-hit entry 123.

The TCAM (OF) lookup entry group 119 is a set of entries for achieving TCAM (OF) lookup in the TCAM (OF) lookup functioning section 116. The L2 table (OF) lookup result referring entry 120 is an entry for referring to the lookup result of the L2 table (OF). The L3 table (OF) lookup result referring entry 121 is an entry for referring to the lookup result of the L3 table (OF). The other table (OF) lookup result referring entry 122 is an entry for referring to the lookup result of the other table (OF). The Miss-hit entry 123 is an entry for dealing a packet that does not hit to any entry as "Miss-hit". That is, these are entries defining the above-mentioned respective actions.

(Operation of OpenFlow Action Resolver)

An operation of the OpenFlow action resolver 107 in FIG. 3 will be described below.

As the lookup order in the OpenFlow table, finally, the TCAM (OF) lookup functioning section 116 performs lookup. It should be noted that in lookup by the TCAM (OF) lookup functioning section 116, the OpenFlow action resolver 107 can be realized by adjusting entry mapping of TCAM (OF) in the switch that can refer to the lookup result of the L2/L3/other tables.

For example, the expected action priority for each table as in inter-table priority 117 can be dealt by mapping as in the entry 118 in TCAM (OF).

In case of an example shown in FIG. 3, the action priority 117 becomes "all compatible (equivalent to TCAM (OF))", "L2 compatible (equivalent to L2 table (OF))", "L3 compatible (equivalent to L3 table (OF))", "other compatible (equivalent to other table)" from the highest priority.

Using as the entry mapping in TCAM (OF), the OpenFlow action resolver 107 may arrange the "TCAM (OF) lookup function realizing entry group 119", the "L2 table (OF) lookup result referring entry 120", the "L3 table (OF) lookup result referring entry 121", the "other table (OF) lookup result referring entry 122", and the "Miss-hit entry 123" in this order from the highest lookup priority of TCAM (OF).

(TCAM (OF) Lookup Entry Group)

The TCAM (OF) lookup function realizing entry group 119 is an entry group for realizing the TCAM (OF) lookup functioning section 116 for the lookup function. When an inputted packet hits to any entry of the TCAM (OF) lookup function realizing entry group 119, the OpenFlow action resolver 107 selects the action of the entry as the action for the packet.

(L2 Table (OF) Lookup Result Referring Entry)

The L2 table (OF) lookup result referring entry 120 is determined to be hit on the basis of the previous lookup result of the L2 table (OF), when the entry corresponding to an inputted packet exists on the L2 table (OF).

For example, when the entry corresponding to an inputted packet exists in the lookup of the L2 table (OF), a flag "X=1" is set, and when the flag "X=1" has been set, the entry is determined to be hit, in the L2 table (OF) lookup result referring entry 120 of TCAM (OF).

When the L2 table (OF) lookup result referring entry 120 is determined to be hit, the OpenFlow action resolver 107 selects the action of the entry of the L2 table (OF) as an action for the packet.

(L3 Table (OF) Lookup Result Referring Entry)

The lookup result referring entry 121 is determined that an entry is hit, on the basis of the previous lookup result of the L3 table (OF) when the entry corresponding to an inputted packet exists on the L3 table (OF).

For example, a flag "Y=1" is set when the entry corresponding to an inputted packet exists in lookup of the L3 table (OF), and when the flag "Y=1" has been set, the entry is determined to be hit in the L3 table (OF) lookup result referring entry 121 on TCAM (OF).

When the L3 table (OF) lookup result referring entry 121 is determined to be hit, the OpenFlow action resolver 107 selects the action of the entry of the L3 table (OF) as an action for the packet.

(Other Table (OF) Lookup Result Referring Entry)

The lookup result referring entry 122 is determined to be hit on the basis of the previous lookup result of the other table (OF), when the entry corresponding to an inputted packet exists on the other table (OF).

For example, when the entry corresponding to the inputted packet exists in lookup of the other table (OF), a flag "Z=1" is set, and when the flag "Z=1" has been set, the entry is determined to be hit in the other table (OF) lookup result referring entry 122 of TCAM (OF).

When the other table (OF) lookup result referring entry 122 is determined to be hit, the OpenFlow action resolver 107 selects the action of the entry of the other table (OF) as an action for the packet.

(Miss-Hit Entry)

The Miss-hit entry 123 is an entry that is determined to be hit when the inputted packet does not hit to any TCAM (OF) entry.

Here, the Miss-hit entry 123 is an entry to which a packet having any pattern hits. When the inputted packet does not hit to any TCAM (OF) entry and hits to only the Miss-hit entry 123, the OpenFlow action resolver 107 selects "Packet-IN" (inquiry of the action of the packet to the controller) or "NORMAL" (packet processing using the legacy functioning section) as an action for the packet according to setting of OpenFlow.

When the user attempts to change the action priority of each table, the order of the entry in TCAM (OF) may be changed.

(Summary of Control of OpenFlow Table)

FIG. 4 is a schematic view showing OpenFlow table control by the controller according to the present invention. The controller 101, the switch 102, the protocol control section 103, and the table group 113 have the same mechanism and function as those in FIG. 1 and FIG. 2.

The switch 102 includes a TCAM 124, an L2 table 125, an L3 table 126, and other table 127.

The TCAM 124 includes TCAM (OF) and TCAM (Legacy). The L2 table 125 includes an L2 table (OF) and an L2 table (Legacy). The L3 table 126 includes an L3 table (OF) and an L3 table (Legacy). The other table 127 includes other table (OF) and other table (Legacy).

The TCAM (OF), the L2 table (OF), the L3 table (OF), and the other table (OF) constitute the OpenFlow table.

The TCAM (Legacy), the L2 table (Legacy), the L3 table (Legacy), and the other table (Legacy) constitutes the legacy table.

Generally, the TCAM 124, the L2 table 125, the L3 table 126, and the other table 127 on the switch 102 is a physical one table.

The switch 102 according to the present invention has a function of logically dividing a single physical table (the TCAM 124, the L2 table 125, the L3 table 126, and the other table 127) into the table group 113 constituting the OpenFlow table and the table group 128 constituting the legacy table. That is, the switch 102 divides and logically integrates one physical table (the TCAM 124, the L2 table 125, the L3 table 126, and the other table 127) on the basis of conditions and processing contents that are defined for each table, to construct the OpenFlow table (table group 113) and the legacy table (table group 128).

The table group 113 constituting the OpenFlow table includes the TCAM (OF), the L2 table (OF), the L3 table (OF), and other tables (OF).

The table group 128 constituting the legacy table includes TCAM (Legacy), an L2 table (Legacy), an L3 table (Legacy), and other table (Legacy).

(Summary of Control of OpenFlow Table)

Summary of OpenFlow table control by the controller in FIG. 4 will be described below.

The controller 101 can control the OpenFlow table of the switch 102 through the protocol control section 103.

Generally, each of the TCAM 124, the L2 table 125, the L3 table 126, and the other table 127 on the switch is a single physical table.

The switch according to the present invention has a function of clipping and using a part of the table resource for OpenFlow, and logically constructing the table group 113 constituting the OpenFlow table and the table group 128 constituting the legacy table. That is, the switch 102 constructs the logical OpenFlow table (table group 113) and legacy table (table group 128) on the basis of the TCAM 124, the L2 table 125, the L3 table 126, and the other table 127.

The tables constituting the OpenFlow table have different feasible OpenFlow functions.

For this reason, the controller 101 needs to perform OpenFlow table control in consideration of "1: What OpenFlow function can be performed in each table?" and "2: Which table constituting the OpenFlow table the entry to be controlled belongs to?"

Regarding "1", for example, "the controller has a following mechanism: a function that can be achieved in each table is previously inputted (Input), and an error is returned, when other type of control is attempted", and "the switch has a following mechanism: an error is returned for a control command from the controller, when the target table does not have the function corresponding to the control".

Regarding "2", for example, "a certain range of the priority (0-64 k) in the OpenFlow table is assigned to each table, and the table to be used is determined on the basis of the priority range, when the controller performs control", or "an ID is assigned to each table constituting the OpenFlow table, the table to be used is determined on the basis of the ID when the controller performs control".

(Details of Control of OpenFlow Table (1))

FIG. 5 is a diagram showing details of an example of a first method of OpenFlow table control by the controller according to the present invention. Here, a case of designating a table by using a priority range will be described.

The controller 101, the switch 102, the OpenFlow table managing section 106, and the table group 113 have the same mechanism and function as those in FIGS. 1 and 2.

The OpenFlow table managing section 106 of the OpenFlow functioning section 105 assigns the priority range to each table of the table group 113 constituting the OpenFlow table.

In case of designating the table on the basis of the priority range, the priority ranges of the tables must not overlap. A total of the priority ranges must not exceed the priority range prescribed in OpenFlow.

The controller 101 designates the table on the basis of a value in the priority range assigned to each table.

The OpenFlow table managing section 106 of the OpenFlow functioning section 105 determines a table to be used on the basis of the value in the priority range, which is designated by the controller 101.

(Details of Control of OpenFlow Table (2))

FIG. 6 is a diagram showing details of an example of a second method of OpenFlow table control by the controller according to the present invention. Here, a case of designating a table by using a table ID will be described.

The controller 101, the switch 102, the OpenFlow table managing section 106, and the table group 113 have the same mechanism and function as those in FIG. 1 and FIG. 2.

The OpenFlow table managing section 106 of the OpenFlow functioning section 105 assigns a table ID 129 to each table of the table group 113 constituting the OpenFlow table.

In case of designating the table on the basis of the table ID, the table IDs must not overlap. On the other hand, the priority ranges set for the tables may overlap. This is because each table is identified according to the table ID 129 as an individual table, and the priority of each table is determined by the OpenFlow action resolver 107.

The controller 101 designates the table according to the table ID 129 assigned to each table.

The OpenFlow table managing section 106 of the OpenFlow functioning section 105 determines the table to be used on the basis of the table ID 129 designated by the controller 101.

(Processing Operation Example at Incoming of Packet (1))

Figure 7A:
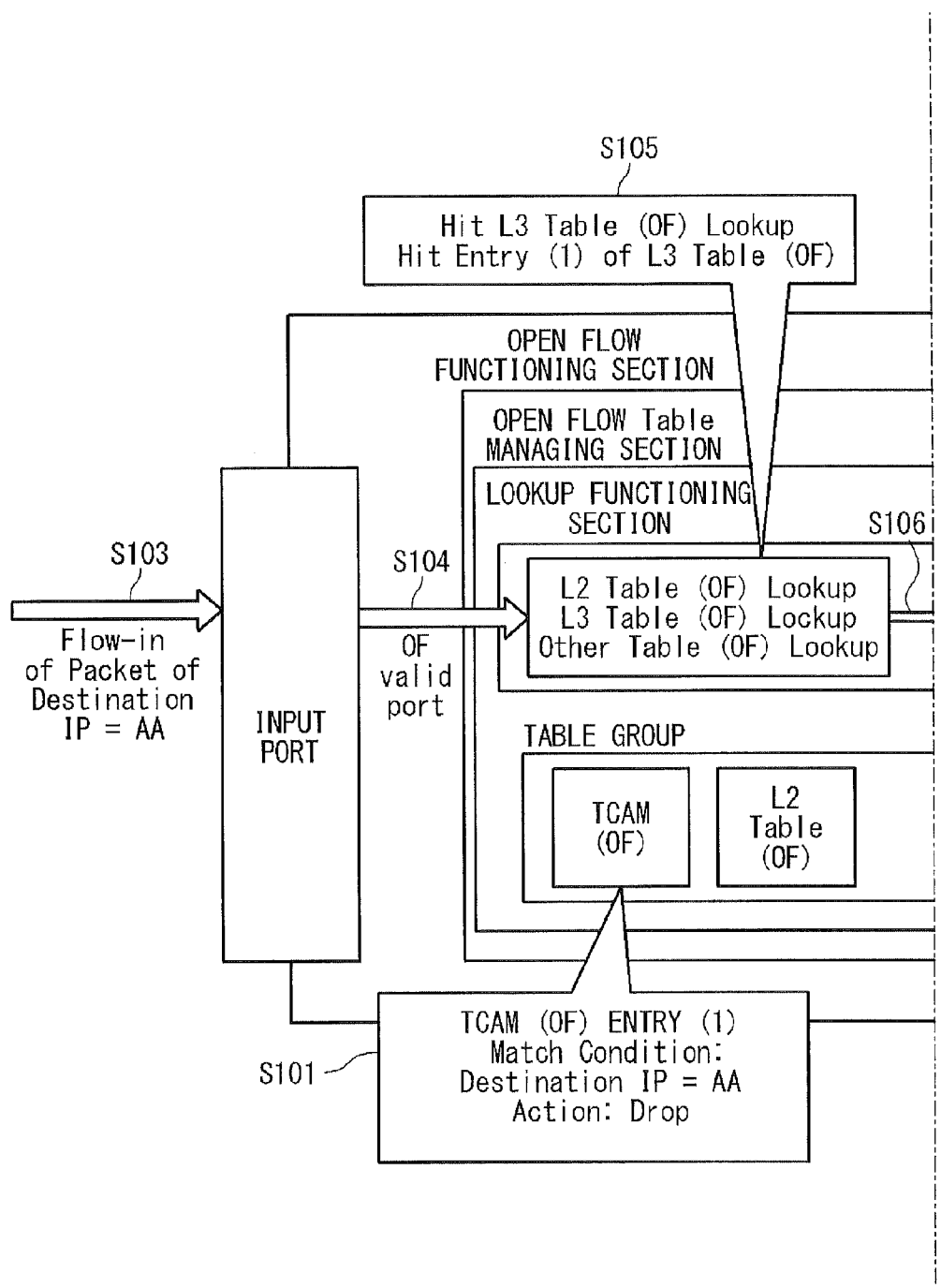
FIG. 7A is a diagram showing a first operation example of the switch system in case of packet inflow.
Figure 7B:
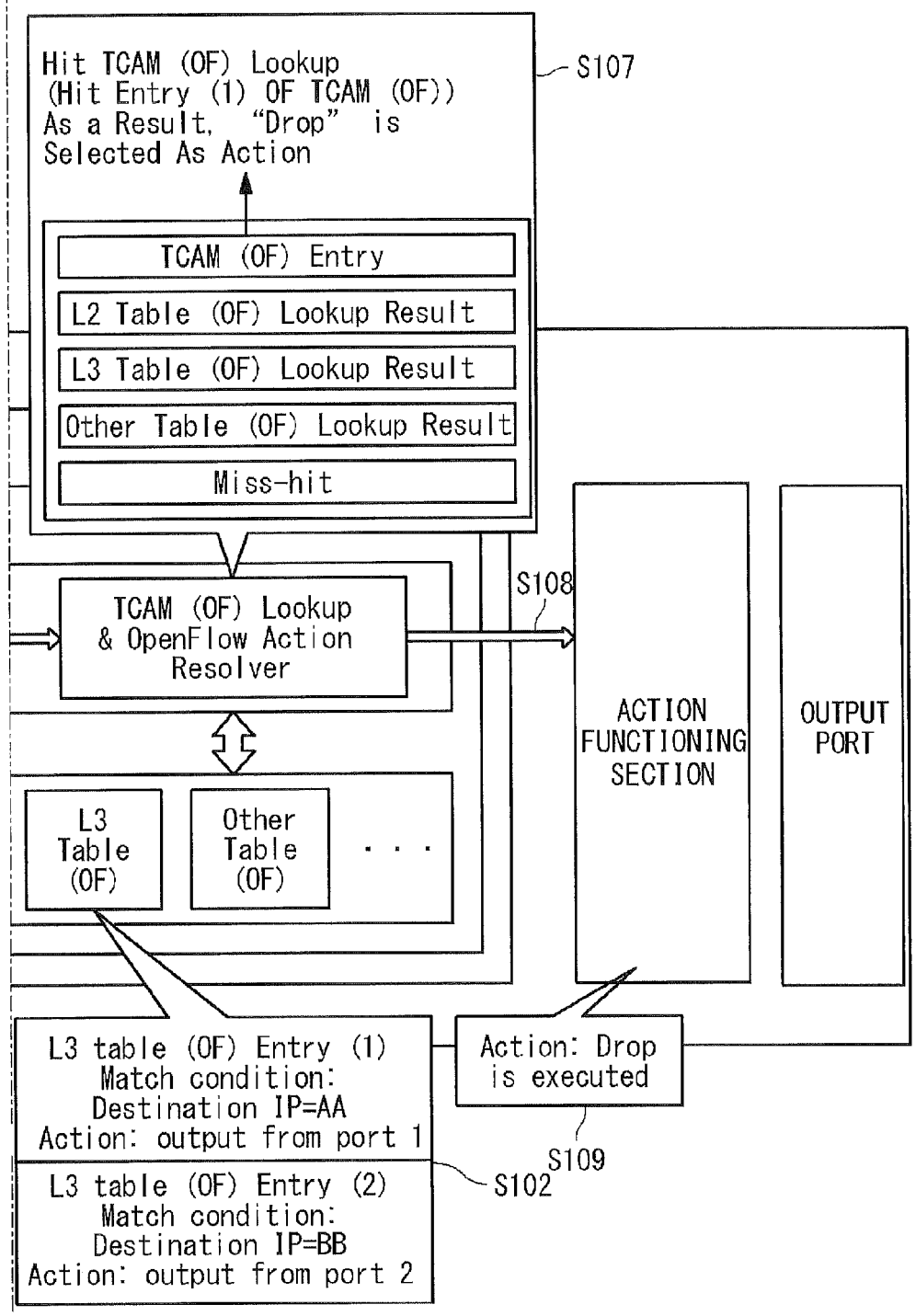
FIG. 7B is a diagram showing the first operation example of the switch system in case of the packet inflow.

FIGS. 7A and 7B show a first operation example of the switching system at incoming of a packet according to the present invention. For simplification, only the function block related to operation is shown. Step S101 to Step S107 show a flow of the entire operation from incoming of packet.

(1) Step S101

The controller 101 previously registers a TCAM (OF) entry (1) of {Match condition: destination IP=AA, Action: Drop} to the switch 102. The switch 102 registers the TCAM (OF) entry (1) in TCAM (OF) of the table group 113.

"Match condition" is defined based on a combination of optional header information of L1 to L4. "Action" defines an action such as relay/discarding/rewriting of header information to the packet that meets the Match condition.

(2) Step S102

The controller 101 previously registers an L3 table (OF) entry (1) of {Match condition: destination IP=AA, Action: output from Port 1} and an L3 table (OF) entry (2) of {Match condition: destination IP=BB, Action: output from Port 2} to the switch 102. The switch 102 registers the L3 table (OF) entry (1) and the L3 table (OF) entry (2) in the L3 table (OF) of the table group 113.

(3) Step S103

When the packet of the destination IP=AA flows into the OpenFlow valid port at incoming of the packet, the input port 104 transmits the packet to the OpenFlow functioning section 105.

(4) Step S104

When the packet of the destination IP=AA flows into the OpenFlow valid port, the OpenFlow functioning section 105 processes the packet.

(5) Step S105

First, in the OpenFlow functioning section 105, the L2/L3/other table (OF) lookup functioning section 115 looks up the incoming packet in the L2/L3/other table (OF). In this lookup, the packet gets a hit for the L3 table (OF) entry (1).

(6) Step S106

The L2/L3/other table (OF) lookup functioning section 115 informs the lookup result to the OpenFlow action resolver 107. In FIG. 7B, the OpenFlow action resolver 107 and the TCAM (OF) lookup functioning section 116 are shown as one function block (TCAM (OF) Lookup & OpenFlow Action Resolver).

(7) Step S107

The TCAM (OF) lookup functioning section 116 looks up the incoming packet in TCAM (OF). In this lookup, the packet first hits to the TCAM (OF) entry (1). At this time, the lookup processing of TCAM (OF) is ended. The TCAM (OF) lookup functioning section 116 informs the lookup result to the OpenFlow action resolver 107.

(8) Step S108

The OpenFlow action resolver 107 receives the lookup result from each of the L2/L3/other table (OF) lookup functioning section 115 and the TCAM (OF) lookup functioning section 116, and determines the action for the incoming packet according to the inter-table priority. Here, the priority of TCAM (OF) is the highest. For this reason, the OpenFlow action resolver 107 determines the action (Drop) of the TCAM (OF) entry (1) as the action for the incoming packet, and informs the determined action (Drop) to the action functioning section 111.

(9) Step S109

The action functioning section 111 performs the action (Drop) determined by the OpenFlow action resolver 107. Here, since the action is "Drop", the action functioning section 111 does not output the packet. The action functioning section 111 discards the incoming packet and subsequent packets belonging to the same flow.

(Processing Operation Example at Incoming of Packet (2))

Figure 8A:
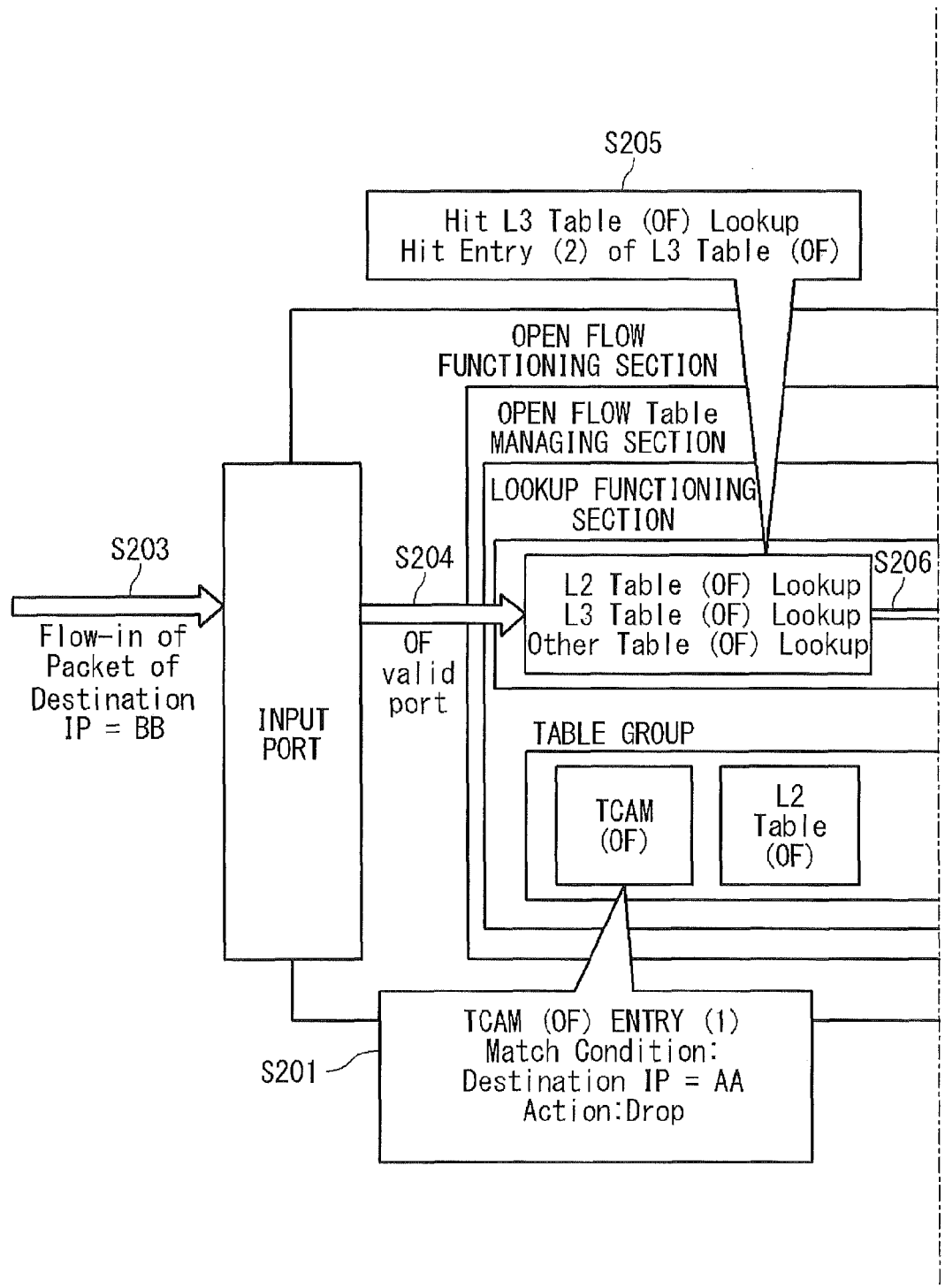
FIG. 8A is a diagram showing a second operation example of the switch system in case of packet inflow.

FIGS. 8A and 8B show a second operation example of the switching system at incoming of a packet according to the present invention. For simplification, only the function blocks related to the operation are shown. Step S201 to Step S210 show a flow of the entire operation from incoming of the packet.

(1) Step S201

The controller 101 previously registers a TCAM (OF) entry (1) of {Match condition: destination IP=AA, Action: Drop} to the switch 102. The switch 102 registers the TCAM (OF) entry (1) in TCAM (OF) of the table group 113.

(2) Step S202

The controller 101 previously registers an L3 table (OF) entry (1) of {Match condition: destination IP=AA, Action: output from Port 1} and an L3 table (OF) entry (2) of {Match condition: destination IP=BB, Action: output from Port 2} to the switch 102. The switch 102 registers the L3 table (OF) entry (1) and the L3 table (OF) entry (2) in the L3 table (OF) of the table group 113.

(3) Step S203

When the packet of the destination IP=BB flows into the OpenFlow valid port at incoming of the packet, the input port 104 transmits the packet to the OpenFlow functioning section 105.

(4) Step S204

When the packet of the destination IP=BB flows to the OpenFlow valid port, the OpenFlow functioning section 105 processes the packet.

(5) Step S205

First, in the OpenFlow functioning section 105, the L2/L3/other table (OF) lookup functioning section 115 looks up the packet in the L2/L3/other table (OF). In this lookup, the packet hits to the L3 table (OF) entry (2).

(6) Step S206

The L2/L3/other table (OF) lookup functioning section 115 informs the OpenFlow action resolver 107 of the lookup result. In FIG. 8B, the OpenFlow action resolver 107 and the TCAM (OF) lookup functioning section 116 are shown as one function block (TCAM (OF) Lookup & OpenFlow Action Resolver).

(7) Step S207

TCAM (OF) lookup functioning section 116 looks up the incoming packet in TCAM (OF). However, since the incoming packet is the packet of the destination IP=BB, no entry that the packet hits to any entry exists in TCAM (OF). At this time, the lookup processing of TCAM (OF) is ended. The TCAM (OF) lookup functioning section 116 informs the lookup result to the OpenFlow action resolver 107. At this time, the lookup processing of TCAM (OF) is ended. The TCAM (OF) lookup functioning section 116 informs the lookup result to the OpenFlow action resolver 107.

(8) Step S208

The OpenFlow action resolver 107 receives the lookup result from each of the L2/L3/other table (OF) lookup functioning section 115 and the TCAM (OF) lookup functioning section 116, and determines an action to the incoming packet according to the inter-table priority. Here, the target entry exists only in the L3 table (OF) entry (2). Thus, the OpenFlow action resolver 107 determines the action (output from Port 2) of the L3 table (OF) entry (2) as the action for the incoming packet, and informs the determined action (output from Port 2) to the action functioning section 111.

(9) Step S209

The action functioning section 111 performs the action (output from Port 2) determined by the OpenFlow action resolver 107.

(10) Step S210

The action functioning section 111 outputs the incoming packet and subsequent packets belonging to the same flow, to the output port 112 having the Port 2.

(11) Step S211

The output port 112 outputs the packets outputted from the action functioning section 111 to the Port 2.

(12) Step S212

The packets outputted from Port 2 flow out to the network and are transmitted toward the destination IP=BB.

In FIGS. 8A and 8B, when the incoming packet hits to any entry in the plurality of tables, the L2/L3/other table (OF) lookup functioning section 115 informs all the hit entries to the OpenFlow action resolver 107 as the lookup result. When no incoming packet hits to any entry in TCAM (OF) of the highest priority, the OpenFlow action resolver 107 adopts the entry hit in the table of the higher priority among the lookup result of the L2/L3/other table (OF) lookup functioning section 115.

In FIGS. 8A and 8B, when the incoming packet hits to entries in the plurality of tables, the L2/L3/other table (OF) lookup functioning section 115 may inform the entry that hits in the table of the higher priority in these tables, to the OpenFlow action resolver 107 as the lookup result according to the inter-table priority 117.

(OpenFlow Table Control Example (1))

Figure 9:
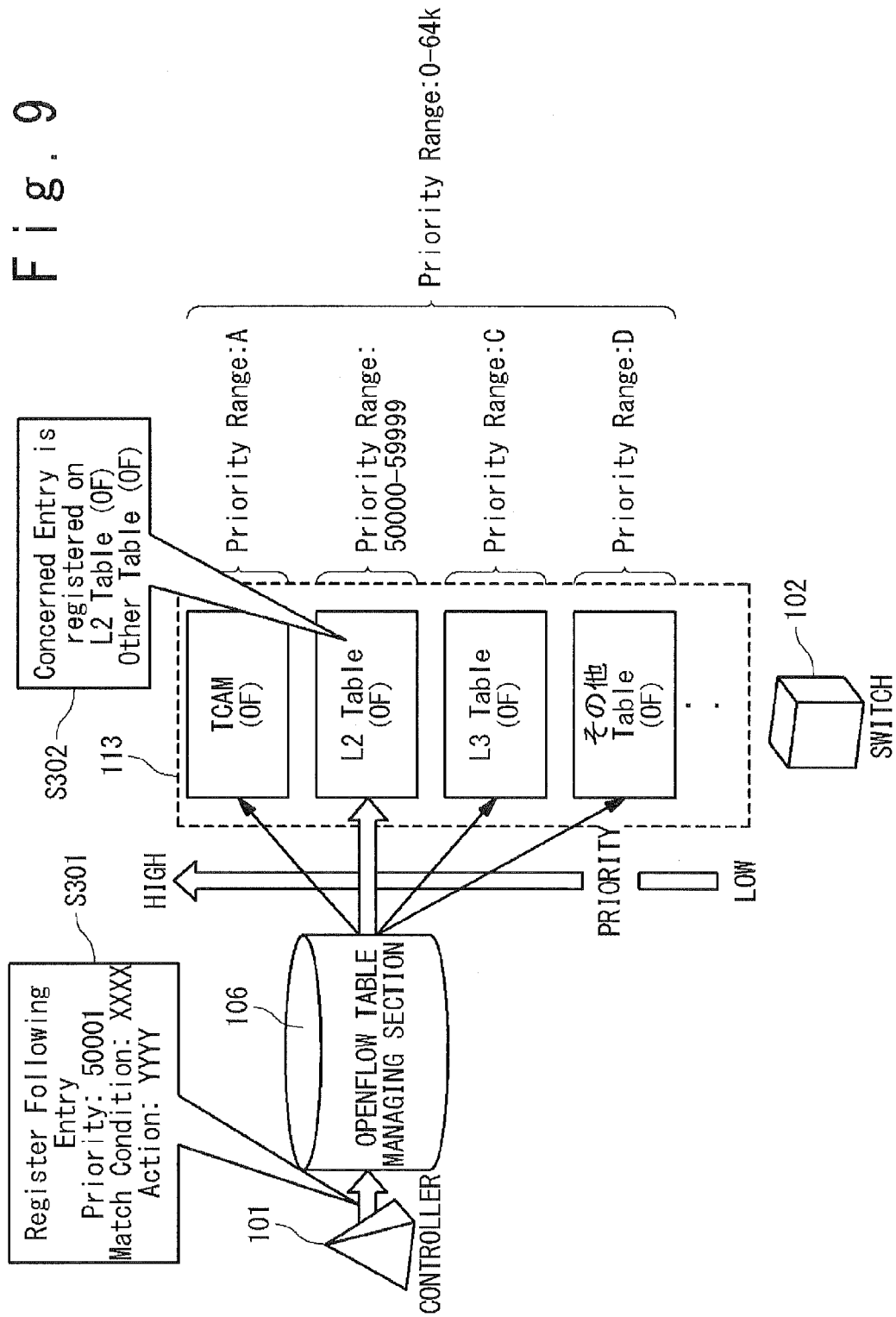
FIG. 9 is a diagram showing a specific example of the first type of open flow table control.

FIG. 9 shows an example of a first method of OpenFlow table control by the controller in case of designating the table on the basis of the priority range.

Registration information 132 is information from the controller 101 to the OpenFlow table managing section 106 of the switch 102. A registration result 133 is a registration result of the table group 113 constituting the OpenFlow table.

When the table group 113 constituting the OpenFlow table is assumed as one table, the switch 102 controls the table expected according to the priority.

(1) Step S301

The controller 101 registers the entry of {priority: 50001, Match condition: XXXX, Action: YYYY} to the switch 102.

(2) Step S302

When the entry is registered from the controller 101, the switch 102 selects the L2 table (OF) as the table according to the priority of the entry, and registers the entry in the L2 table (OF).

(OpenFlow Table Control Example (2))

Figure 10:
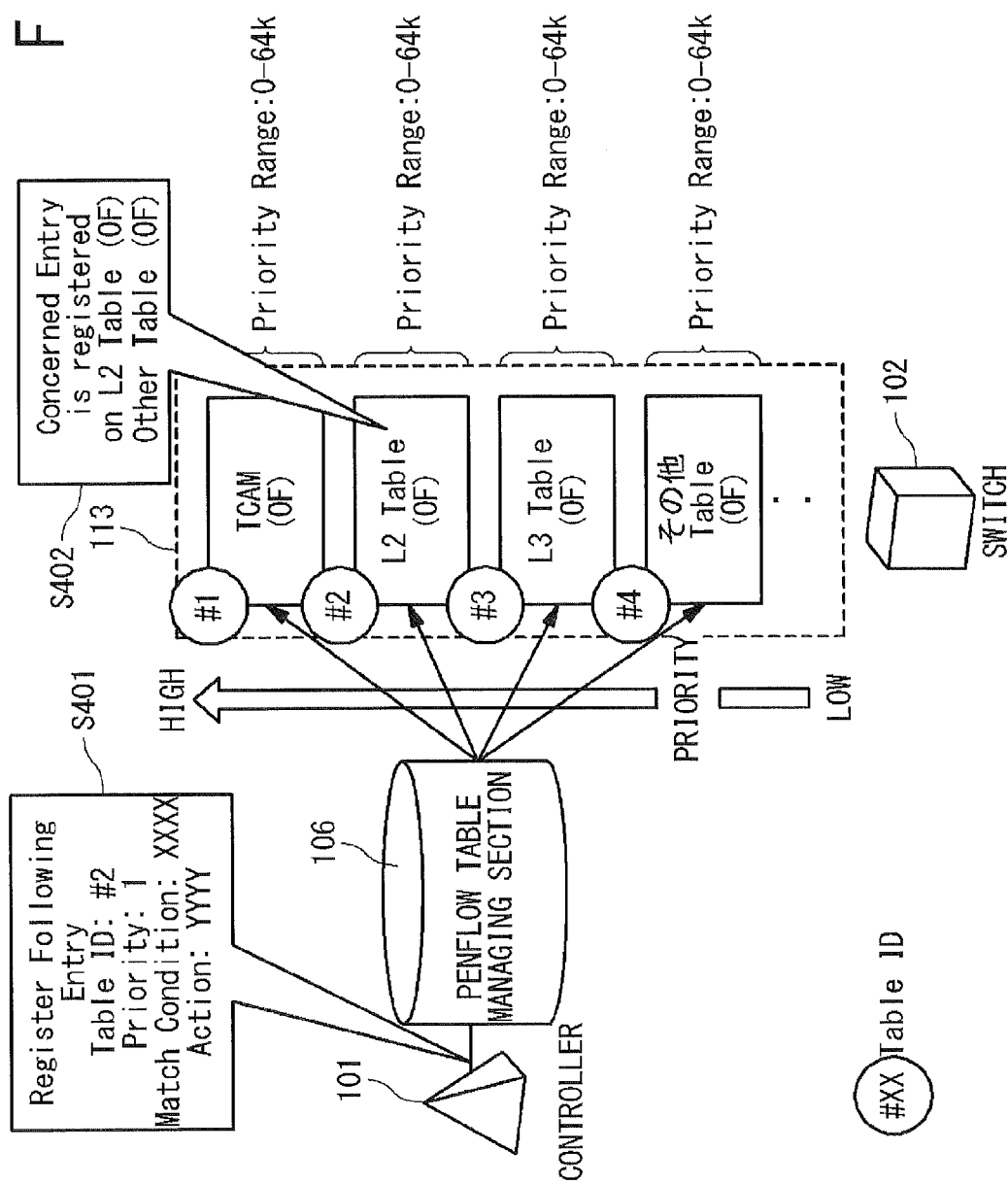
FIG. 10 is a diagram showing a specific example of the second method of open flow table control.

FIG. 10 shows an example of a second method of OpenFlow table control by the controller in case of designating the table on the basis of the table ID.

Registration information 134 is registration information from the controller to the OpenFlow table. A registration result 135 is a registration result to the table group constituting the OpenFlow table.

When the tables of the table group constituting the OpenFlow table are assumed as different OpenFlow tables, the switch 102 controls the table expected according to the table ID.

(1) Step S401

The controller 101 registers the entry of {table ID: #2, priority: 1, Match condition: XXXX, Action: YYYY} to the switch 102.

(2) Step S402

When the entry is registered from the controller 101, the switch 102 selects the L2 table (OF) as the table according to the table ID, and registers the entry in the L2 table (OF).

(Features of First Exemplary Embodiment)

In this exemplary embodiment, the OpenFlow action resolver can integrate resources of the plurality of tables, and compare the priorities of the tables with each other to resolve the action.

Accordingly, the large-capacity OpenFlow table can be constructed by using the resource of the plurality of tables of the switch. Thereby, the switch can control a large amount of flow.

In this exemplary embodiment, each table constituting the OpenFlow table can be identified on the basis of the "priority range" in case of using the OpenFlow table as one large-capacity OpenFlow table, or the "table ID" in case of using each table of the table group constituting the OpenFlow table as the plurality of different OpenFlow tables.

Accordingly, the OpenFlow table constituted of the plurality of tables of the switch can be used as one large-capacity OpenFlow table or the plurality of different OpenFlow tables. Thereby, the OpenFlow table configured from the plurality of tables can be flexibly controlled.

Second Exemplary Embodiment

A second exemplary embodiment of the present invention will be described below with reference to the attached drawings. The second exemplary embodiment is an exemplary embodiment of the OpenFlow action resolver when the TCAM (OF) lookup functioning section does not includes the OpenFlow action resolver.

Example 1

Figure 11:
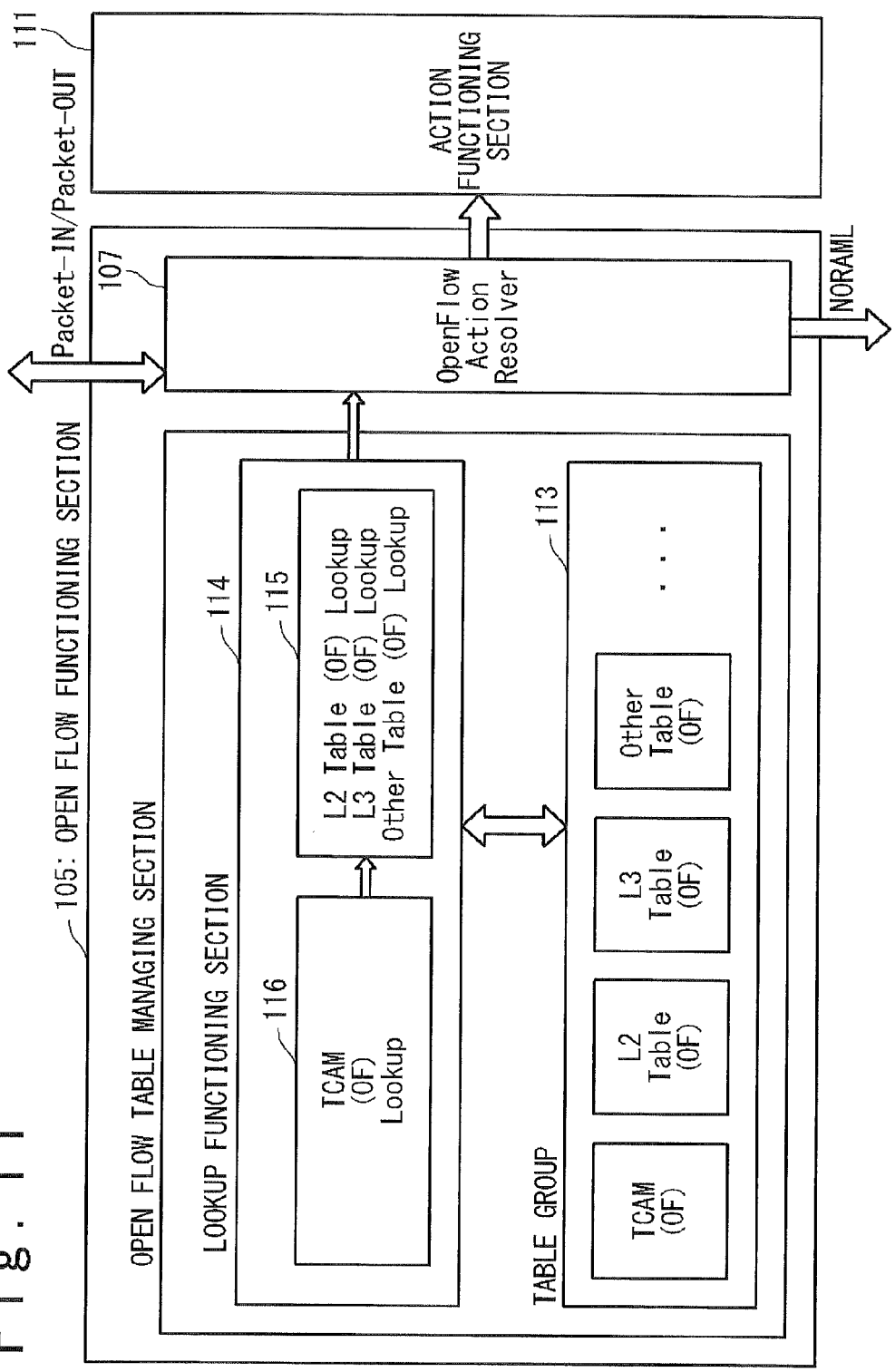
FIG. 11 is a conceptual diagram showing details of an example 1 of the switch system according to a second exemplary embodiment of the present invention.

FIG. 11 is a diagram showing details of the OpenFlow functioning section 105 when lookup is performed by the "TCAM (OF) lookup functioning section 116" and the "L2/L3 other table (OF) lookup functioning section 115" in this order.

The OpenFlow functioning section 105, the OpenFlow table managing section 106, the OpenFlow action resolver 107, the action functioning section 111, the table group 113, the lookup functioning section 114, the L2/L3/other table (OF) lookup functioning section 115, and the TCAM (OF) lookup functioning section 116 have the same mechanism and function as those in FIG. 2.

Referring to FIG. 11, an operation of the OpenFlow functioning section 105 will be described when lookup is performed by the "TCAM (OF) lookup functioning section 116" and the "L2/L3 other table (OF) lookup functioning section 115" in this order.

FIG. 11 shows a case where, in the lookup functioning section 114 of the OpenFlow table managing section 106, the TCAM (OF) lookup functioning section 116 does not finally perform lookup.

In FIG. 11, since the lookup is performed by the "TCAM (OF) lookup functioning section 116" and the "L2/L3 other table (OF) lookup functioning section 115" in this order, the TCAM (OF) lookup functioning section 116 cannot include the OpenFlow action resolver 107.

Example 2

Figure 12:
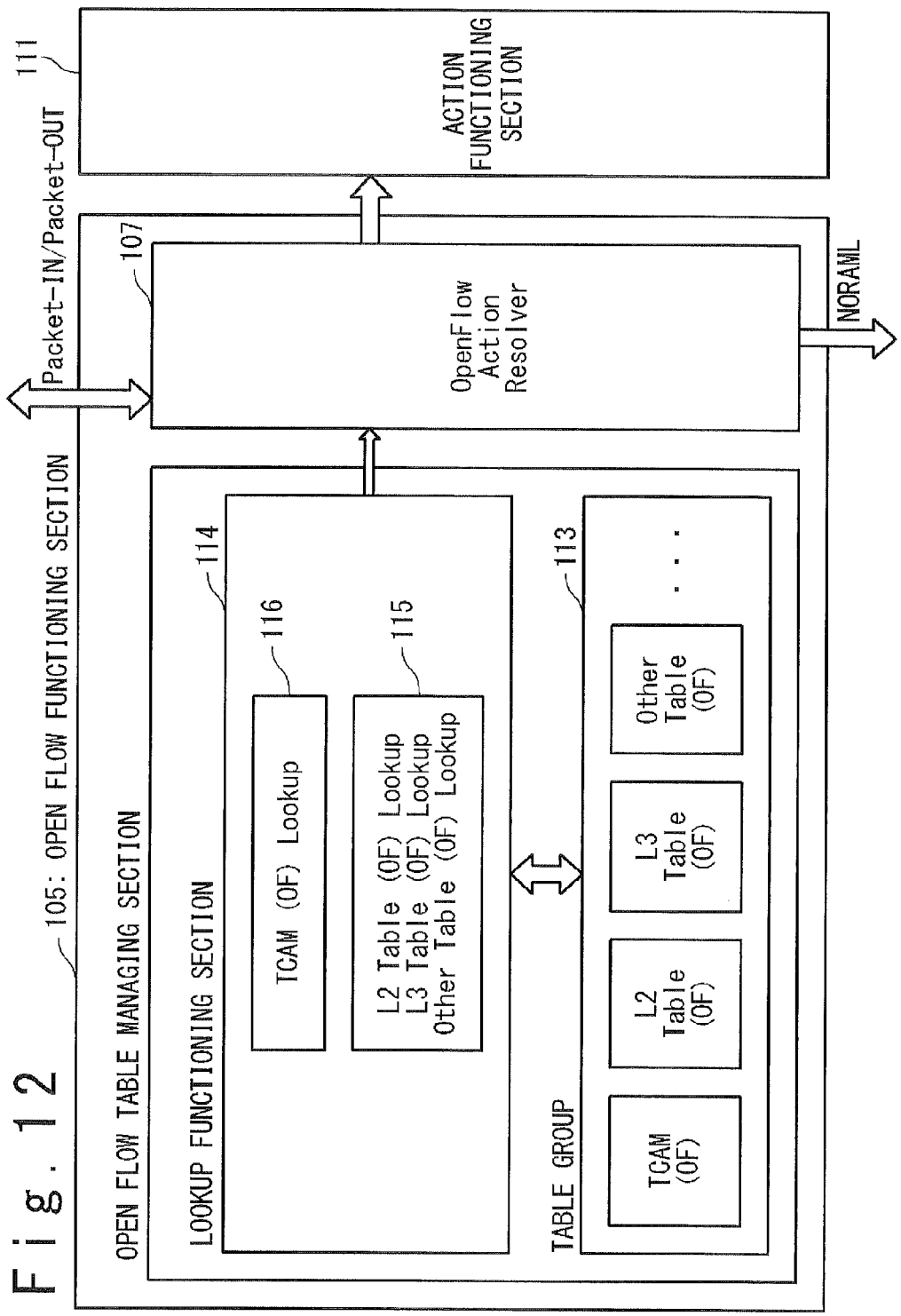
FIG. 12 is a conceptual diagram showing details of an example 2 of the switch system according to the second exemplary embodiment of the present invention.

FIG. 12 is a diagram showing details of the OpenFlow functioning section 105 when the L2/L3 other table (OF) lookup functioning section 115 and the TCAM (OF) lookup functioning section 116 simultaneously perform the lookup.

The OpenFlow functioning section 105, the OpenFlow table managing section 106, the OpenFlow action resolver 107, the action functioning section 111, the table group 113, the lookup functioning section 114, the L2/L3/other table (OF) lookup functioning section 115, and the TCAM (OF) lookup functioning section 116 have the same mechanism and function as those in FIG. 2.

Referring to FIG. 12, an operation of the OpenFlow functioning section 105 will be described when the L2/L3 other table (OF) lookup functioning section 115 and the TCAM (OF) lookup functioning section 116 simultaneously perform the lookup.

FIG. 12 shows a case where, in the lookup functioning section 114 of the OpenFlow table managing section 106, the TCAM (OF) lookup functioning section 116 does not finally perform the lookup.

Since the L2/L3 other table (OF) lookup functioning section 115 and the TCAM (OF) lookup functioning section 116 simultaneously perform the lookup, the TCAM (OF) lookup functioning section 116 cannot include the OpenFlow action resolver 107.

Example 3

Figure 13:
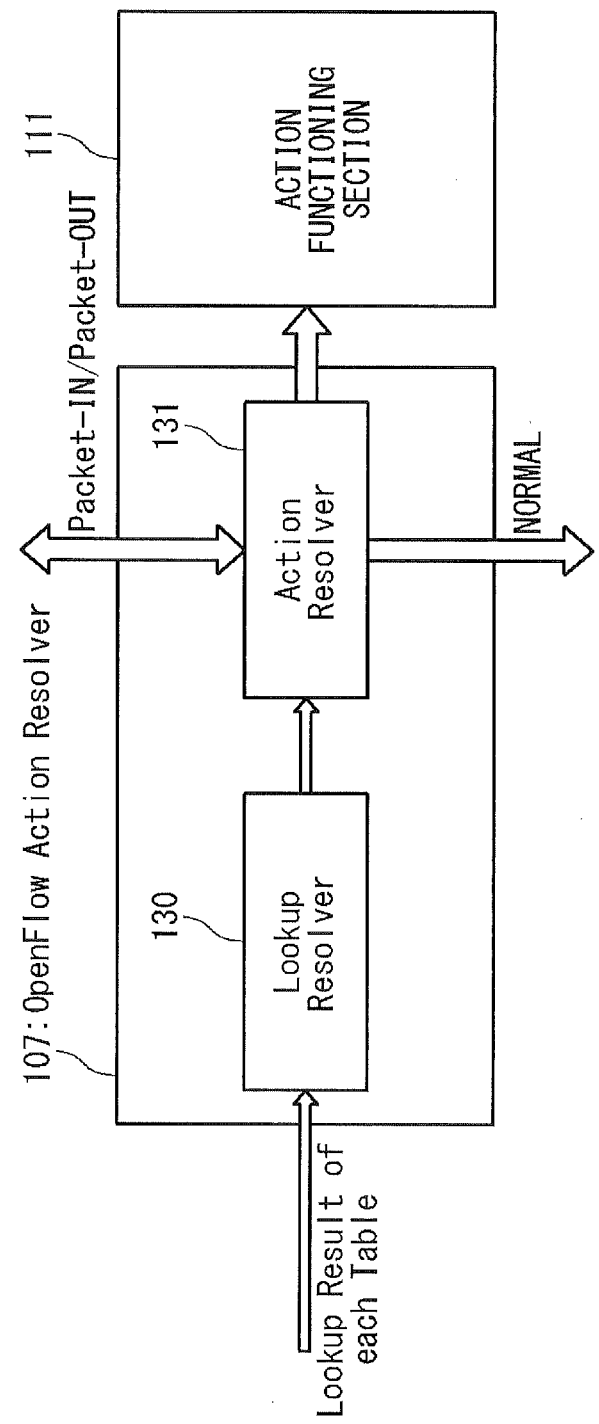
FIG. 13 is a conceptual diagram showing details of an example 3 of the switch system according to the second exemplary embodiment of the present invention.

FIG. 13 shows an exemplary embodiment of the OpenFlow action resolver 107 when the TCAM (OF) lookup functioning section 116 cannot include the OpenFlow action resolver 107.

The OpenFlow action resolver 107 and the action functioning section 111 have the same mechanism and function as those in FIG. 2.

The OpenFlow action resolver 107 includes a lookup receiving section (Lookup Receiver) 130 and a process resolving section (Action Resolver) 131.

The lookup receiving section (Lookup Receiver) 130 receives the lookup result of each table. The process resolving section (Action Resolver) 131 determines the OpenFlow processing on the basis of the lookup result of each table.

Referring to FIG. 13, an operation of the OpenFlow action resolver 107 will be described when the TCAM (OF) lookup functioning section 116 cannot include the OpenFlow action resolver 107.

When TCAM (OF) lookup functioning section 116 cannot include the OpenFlow action resolver 107, the OpenFlow action resolver 107 as shown in FIG. 13 is mounted in the switch 102.

In the OpenFlow action resolver 107, the lookup receiving section (Lookup Receiver) 130 receives the lookup result of each table. The process resolving section (Action Resolver) 131 determines the action of OpenFlow on the basis of the lookup result of each table and the previously set inter-table priority, and informs the determined action to the action functioning section 111.

Other Exemplary Embodiments

Although the switch 102 will be described as the OpenFlow switch in each of the above-mentioned exemplary embodiments, the OpenFlow switch is merely an example. In fact, the switch is not limited to the OpenFlow switch, and the present invention can be also applied to any switch having the same mechanism and function as the OpenFlow switch.

<Features of the Present Invention>

The present invention relates to a method of extending the OpenFlow table by the integration of the plurality of tables.

According to the present invention, in the OpenFlow table constituted of a single table (mainly TCAM) of the switch, extension of the number of flow entries in the OpenFlow table is achieved by constructing the OpenFlow table from the plurality of tables of the switch.

In the OpenFlow technique, a transfer function and a control function have been mounted in the same NW equipment (router/switch and the like), and are separated from each other, the transfer function still remains in the NW equipment, and the control function is replaced with an external controller. The controller remotely operates the OpenFlow table in the NW equipment according to the OpenFlow protocol to control the behavior of the NW equipment. The OpenFlow table is constituted of a flow entry group including three types of information: {Match condition, Action, statistical information}. In the OpenFlow technique, the match condition defines a flow to be controlled, and the action and statistical information can be acquired in units of flows.

Summary of {Match condition, Action, statistical information} of OpenFlow is as follows.

(Match Condition)

"Ingress port (input port)"/"Src MAC (source MAC address)"/"Dst MAC (destination MAC address)"/"Ether type (type/field)"/"VLAN ID (virtual LAN identification information)"/"VLAN Priority (virtual LAN priority)"/"Src IP (source IP address)"/"Dst IP (destination IP address)"/"IP protocol (IP protocol number)"/"IP ToS (upper 6 bit)"/"Src Port (source port number)"/"Dst Port (destination port number)"

(Action)

"Forward (output from physical port)"/"All (output from all ports other than input port)"/"Controller (output to controller)"/"Local (output to local stack of the device)"/"Table (output according to contents in the OpenFlow table)"/ "In_port (output from input port)"/"Normal (output using contents in legacy table)"/"Flood (output from all ports other than input port and block port of Spanning Tree)"/"Drop (discard a packet)"/"Modify-Field (rewrite header information of packet)"

For example, in case of "Modify-Field", "VLAN ID", "Vlan priority (Priority)", "Src MAC", "Dst MAC", "Src IP", "Dst IP", "IP ToS", "Src Port", and "Dst Port" can be rewritten.

(Statistical Information)

Various type of statistical information in units of "table", "flow", "physical port", and "queue (Queue)"

According to the present invention, the extension of the number of flow entries in the OpenFlow table as the device can be realized without increasing the capacity of the table (mainly TCAM) itself of the switch by constituting the OpenFlow table by using the plurality of tables of the switch. That is, the plurality of tables in the switch can be used as the large-capacity OpenFlow table from the side of the controller.

Specifically, integration into the OpenFlow table is achieved by absorbing a difference between functions (Match condition/Action) of each table. Since the plurality of tables of the switch each have an original use (for example, L2 relay in the L2 table, L3 relay in the L3 table), all resources are not used, and a part of resources is cut out and used.

As described above, the features of the present invention are "to absorb the Match condition/Action difference of the plurality of tables and integrate the tables into the OpenFlow table", and "to provide the specific action determining method".

According to the present invention, a part of the plurality of table resources of the switch is used as the OpenFlow table.

According to the present invention, each table of the switch is dealt as "function-restricted OpenFlow table resource" according to the feasible function (Match condition/Action).

According to the present invention, the OpenFlow action resolver absorbs the difference between functions (Match condition/Action) of each table resource, and integrates the resources as the OpenFlow table resource.

According to the present invention, the OpenFlow action resolver determines the action on the basis of the priority (Priority) of tables including TCAM.

In the switch in which TCAM (OF) lookup is finally performed, the OpenFlow action resolver is included in the TCAM (OF) lookup functioning section.

According to the present invention, the OpenFlow table configured of the plurality of tables is flexibly controlled by the controller.

According to the present invention, when the plurality of tables are used as one OpenFlow table, the table is identified on the basis of the priority range.

According to the present invention, when the plurality of tables are used as the OpenFlow table, the tables are identified based on the table ID.

Although the exemplary embodiments of the present invention have been described in detail, the present invention is not limited to the above-mentioned exemplary embodiments, and modifications that do not deviate from the subject matter of the present invention fall within the scope of the present invention.

This application claims a priority based on Japanese Patent Application No. JP 2010-200690. The disclosure thereof is incorporated herein by reference.

The invention claimed is:

1. A switch system comprising:
an open flow functioning section which configures an open flow table by logically combining a plurality of tables, each of which defines processing to a predetermined reception packet, based on a condition and a processing content which are defined in each table, and which refers to said open flow table to determine the processing content to the reception packet; and
an action functioning section which executes processing to said reception packet based on the determined processing content,
wherein said logically-combined open flow table fully includes a TCAM (Ternary Content Addressable Memory),
wherein said open flow functioning section comprises:
an L2/L3/other table search functioning section which searches an L2 table, an L3 table and the other table of said plurality of tables based on the reception packet, to output an entry corresponding to the reception packet as a search result;
a TCAM (Ternary Content Addressable Memory) search functioning section which searches TCAM of said plurality of tables based on the reception packet, to output an entry corresponding to the reception packet as the search result; and an open flow processing solving section which defines priorities of the TCAM, the L2 table, the L3 table and the other table, receives the search results from said L2/L3/other table search functioning section and said TCAM search functioning section, determines the entry to be adopted based on the priorities, and determines the processing content to the reception packet.

2. The switch system according to claim 1, wherein said open flow functioning section comprises:

means for allocating a predetermined range of the priorities to each of said plurality of tables configuring said open flow table; and means for determining a table, to be used, of said plurality of tables based on a range of the priorities specified from a controller when said open flow table is controlled from said controller.

3. The switch system according to claim 1, wherein said open flow functioning section comprises:

means for setting a table identifier to each of said plurality of tables configuring said open flow table; and means for determining a table to be used of said plurality of tables based on the table identifier specified from a controller when said open flow table is controlled from said controller.

4. A switch control method which is executed in an open flow switch, said switch control method comprising:

configuring an open flow table by logically combining a plurality of tables, each of which defines processing to a reception packet, based on a condition and a processing content defined in each table;

referring to said open flow table to determine the processing content to the reception packet;

executing the processing of the reception packet based on the determined processing content, wherein said logically-combined open flow table fully includes a TCAM (Ternary Content Addressable Memory);

searching an L2 table, an L3 table and other table of said plurality of tables based on the reception packet to output corresponding to the reception packet as a search result;

searching TCAM (Ternary Content Addressable Memory) based on the reception packet of said plurality of tables to output an entry corresponding to the reception packet as the search result; and defining priorities of the TCAM, the L2 table, the L3 table and the other tables, determining the entry to be adopted from the search result of each table based on the priorities, and determining the processing content to the reception packet.

5. The switch control method according to claim 4, further comprising:

allocating a predetermined range of the priorities to each of said plurality of tables configuring said open flow table; and determining a table to be used of said plurality of tables based on a range of the priorities specified from a controller when said open flow table is controlled from said controller.

6. The switch control method according to claim 4, further comprising:

setting a table identifier to each of said plurality of tables configuring said open flow table; and determining a table to be used of said plurality of tables based on the table identifier specified from a controller when said open flow table is controlled from said controller.

7. A non-transitory recording medium in which a program is stored which makes a computer used as a switch execute, comprising:

configuring an open flow table by logically combining a plurality of tables, each of which defines processing to a given packet, based on a condition and a processing content defined in each table;

referring to said open flow table to determine the processing content to the reception packet;

executing the processing of the reception packet based on the determined processing content, wherein said logically-combined open flow table fully includes a TCAM (Ternary Content Addressable Memory);

searching an L2 table, an L3 table and other table of said plurality of tables based on the reception packet to output an entry corresponding to the reception packet as a search result;

searching TCAM (Ternary Content Addressable Memory) based on the reception packet of said plurality of tables to output an entr corresponding to the reception packet as the search result; and defining priorities of the TCAM, the L2 table, the L3 table and the other tables, determining the entry to be adopted from the search result of each table based on the priorities, and determining the processing content to the reception packet.

8. The switch system according to claim 1, wherein the plurality of tables are logically combined to the TCAM to generate the logically-combined open flow table which fully includes the TCAM, and wherein the logically-combined open flow table is larger than the TCAM.

9. The switch control method according to claim 4, wherein the plurality of tables are logically combined to the TCAM to generate the logically-combined open flow table which fully includes the TCAM, and wherein the logically-combined open flow table is larger than the TCAM.

10. The non-transitory recording medium according to claim 7, wherein the plurality of tables are logically combined to the TCAM to generate the logically-combined open flow table which fully includes the TCAM, and wherein the logically-combined open flow table is larger than the TCAM.

* * * * *

UNITED STATES PATENT AND TRADEMARK OFFICE
CERTIFICATE OF CORRECTION

PATENT NO. : 9,577,931 B2  
APPLICATION NO. : 13/821344  
DATED : February 21, 2017  
INVENTOR(S) : Yoji Suzuki et al.

Page 1 of 1

It is certified that error appears in the above-identified patent and that said Letters Patent is hereby corrected as shown below:

In the Claims

Claim 7, Column 20, Line 33, "entr" should read as --entry--.

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*